US012606160B2

(12) United States Patent
Ihlenburg et al.

(10) Patent No.: US 12,606,160 B2
(45) Date of Patent: *Apr. 21, 2026

(54) VEHICULAR MULTI-SENSOR SENSING SYSTEM

(71) Applicant: MAGNA ELECTRONICS INC., Auburn Hills, MI (US)

(72) Inventors: Joern Ihlenburg, Berlin (DE); Achim Gieseke, Gross-Umstadt (DE); Bernhard Thaler, Munich (DE); Goerg Pflug, Weil der Stadt (DE)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/808,179

(22) Filed: Aug. 19, 2024

(65) Prior Publication Data

US 2024/0409088 A1 Dec. 12, 2024

Related U.S. Application Data

(63) Continuation of application No. 18/332,812, filed on Jun. 12, 2023, now Pat. No. 12,065,136, which is a
(Continued)

(51) Int. Cl.
B60W 30/09 (2012.01)
B60W 10/18 (2012.01)
(Continued)

(52) U.S. Cl.
CPC ............ B60W 30/09 (2013.01); B60W 10/18 (2013.01); B60W 10/20 (2013.01); B60W 50/14 (2013.01);
(Continued)

(58) Field of Classification Search
None
See application file for complete search history.

(56) References Cited

U.S. PATENT DOCUMENTS 5,001,558 A   3/1991  Burley et al.
5,003,288 A   3/1991  Wilhelm
(Continued)

FOREIGN PATENT DOCUMENTS

EP     0426503 A1   5/1991
EP     0492591 A1   7/1992
(Continued)

OTHER PUBLICATIONS

G. Wang, D. Renshaw, P.B. Denyer and M. Lu, CMOS Video Cameras, article, 1991, 4 pages, University of Edinburgh, UK.
(Continued)

*Primary Examiner* — Navid Z. Mehdizadeh
*Assistant Examiner* — Jason R Roberson
(74) *Attorney, Agent, or Firm* — HONIGMAN LLP

(57) ABSTRACT

A vehicular multi-sensor sensing system includes a plurality of sensors disposed at an equipped vehicle and sensing forward of the vehicle. Data based at least in part on processing of sensor data captured by at least one of the sensors is wirelessly transmitted from the equipped vehicle to a remote server. The wirelessly transmitted data is conjuncted to a current geographic location of the equipped vehicle along a road being travelled by the equipped vehicle. The remote server merges data wirelessly transmitted from the equipped vehicle to the remote server with data wirelessly transmitted from a plurality of other vehicles traveling along the road along which the equipped vehicle is traveling, and processes the merged data to determine at least one characteristic along the road being travelled by the equipped vehicle.

48 Claims, 16 Drawing Sheets

Related U.S. Application Data continuation of application No. 17/655,381, filed on Mar. 18, 2022, now Pat. No. 11,673,546, which is a continuation of application No. 15/924,892, filed on Mar. 19, 2018, now Pat. No. 11,279,343, which is a continuation of application No. 14/867,069, filed on Sep. 28, 2015, now Pat. No. 9,919,705, which is a continuation of application No. 13/660,306, filed on Oct. 25, 2012, now Pat. No. 9,146,898.

(60) Provisional application No. 61/552,167, filed on Oct. 27, 2011.

(51) Int. Cl.

| | |
|---|---|
| *B60W 10/20* | (2006.01) |
| *B60W 50/14* | (2020.01) |
| *G06F 17/00* | (2019.01) |
| *G06V 20/58* | (2022.01) |
| *G08G 1/16* | (2006.01) |

(52) U.S. Cl.

CPC .............. *G06F 17/00* (2013.01); *G06V 20/58* (2022.01); *G08G 1/166* (2013.01); *B60W 2400/00* (2013.01); *B60W 2420/403* (2013.01); *B60W 2420/408* (2024.01); *B60W 2554/00* (2020.02); *B60W 2554/801* (2020.02); *B60W 2556/00* (2020.02); *B60W 2556/65* (2020.02); *B60W 2710/18* (2013.01); *B60W 2710/20* (2013.01)

(56) References Cited

U.S. PATENT DOCUMENTS

| | | | |
|---|---|---|---|
| 5,012,082 | A | 4/1991 | Watanabe |
| 5,016,977 | A | 5/1991 | Baude et al. |
| 5,027,001 | A | 6/1991 | Torbert |
| 5,027,200 | A | 6/1991 | Petrossian et al. |
| 5,044,706 | A | 9/1991 | Chen |
| 5,055,668 | A | 10/1991 | French |
| 5,059,877 | A | 10/1991 | Teder |
| 5,064,274 | A | 11/1991 | Alten |
| 5,072,154 | A | 12/1991 | Chen |
| 5,086,253 | A | 2/1992 | Lawler |
| 5,096,287 | A | 3/1992 | Kakinami et al. |
| 5,097,362 | A | 3/1992 | Lynas |
| 5,121,200 | A | 6/1992 | Choi |
| 5,124,549 | A | 6/1992 | Michaels et al. |
| 5,130,709 | A | 7/1992 | Toyama et al. |
| 5,148,014 | A | 9/1992 | Lynam et al. |
| 5,168,378 | A | 12/1992 | Black |
| 5,170,374 | A | 12/1992 | Shimohigashi et al. |
| 5,172,235 | A | 12/1992 | Wilm et al. |
| 5,177,685 | A | 1/1993 | Davis et al. |
| 5,182,502 | A | 1/1993 | Slotkowski et al. |
| 5,184,956 | A | 2/1993 | Langlais et al. |
| 5,189,561 | A | 2/1993 | Hong |
| 5,193,000 | A | 3/1993 | Lipton et al. |
| 5,193,029 | A | 3/1993 | Schofield et al. |
| 5,204,778 | A | 4/1993 | Bechtel |
| 5,208,701 | A | 5/1993 | Maeda |
| 5,245,422 | A | 9/1993 | Borcherts et al. |
| 5,253,109 | A | 10/1993 | O'Farrell et al. |
| 5,276,389 | A | 1/1994 | Levers |
| 5,285,060 | A | 2/1994 | Larson et al. |
| 5,289,182 | A | 2/1994 | Brillard et al. |
| 5,289,321 | A | 2/1994 | Secor |
| 5,305,012 | A | 4/1994 | Faris |
| 5,307,136 | A | 4/1994 | Saneyoshi |
| 5,309,137 | A | 5/1994 | Kajiwara |
| 5,313,072 | A | 5/1994 | Vachss |
| 5,325,096 | A | 6/1994 | Pakett |
| 5,325,386 | A | 6/1994 | Jewell et al. |
| 5,329,206 | A | 7/1994 | Slotkowski et al. |
| 5,331,312 | A | 7/1994 | Kudoh |
| 5,336,980 | A | 8/1994 | Levers |
| 5,341,437 | A | 8/1994 | Nakayama |
| 5,351,044 | A | 9/1994 | Mathur et al. |
| 5,355,118 | A | 10/1994 | Fukuhara |
| 5,374,852 | A | 12/1994 | Parkes |
| 5,386,285 | A | 1/1995 | Asayama |
| 5,394,333 | A | 2/1995 | Kao |
| 5,406,395 | A | 4/1995 | Wilson et al. |
| 5,410,346 | A | 4/1995 | Saneyoshi et al. |
| 5,414,257 | A | 5/1995 | Stanton |
| 5,414,461 | A | 5/1995 | Kishi et al. |
| 5,416,313 | A | 5/1995 | Larson et al. |
| 5,416,318 | A | 5/1995 | Hegyi |
| 5,416,478 | A | 5/1995 | Morinaga |
| 5,424,952 | A | 6/1995 | Asayama |
| 5,426,294 | A | 6/1995 | Kobayashi et al. |
| 5,430,431 | A | 7/1995 | Nelson |
| 5,434,407 | A | 7/1995 | Bauer et al. |
| 5,440,428 | A | 8/1995 | Hegg et al. |
| 5,444,478 | A | 8/1995 | Lelong et al. |
| 5,451,822 | A | 9/1995 | Bechtel et al. |
| 5,457,493 | A | 10/1995 | Leddy et al. |
| 5,461,357 | A | 10/1995 | Yoshioka et al. |
| 5,461,361 | A | 10/1995 | Moore |
| 5,469,298 | A | 11/1995 | Suman et al. |
| 5,471,515 | A | 11/1995 | Fossum et al. |
| 5,475,494 | A | 12/1995 | Nishida et al. |
| 5,487,116 | A | 1/1996 | Nakano et al. |
| 5,498,866 | A | 3/1996 | Bendicks et al. |
| 5,500,766 | A | 3/1996 | Stonecypher |
| 5,510,983 | A | 4/1996 | Lino |
| 5,515,448 | A | 5/1996 | Nishitani |
| 5,521,633 | A | 5/1996 | Nakajima et al. |
| 5,528,698 | A | 6/1996 | Kamei et al. |
| 5,529,138 | A | 6/1996 | Shaw et al. |
| 5,530,240 | A | 6/1996 | Larson et al. |
| 5,530,420 | A | 6/1996 | Tsuchiya et al. |
| 5,535,314 | A | 7/1996 | Alves et al. |
| 5,537,003 | A | 7/1996 | Bechtel et al. |
| 5,539,397 | A | 7/1996 | Asanuma et al. |
| 5,541,590 | A | 7/1996 | Nishio |
| 5,550,677 | A | 8/1996 | Schofield et al. |
| 5,555,312 | A | 9/1996 | Shima et al. |
| 5,555,555 | A | 9/1996 | Sato et al. |
| 5,568,027 | A | 10/1996 | Teder |
| 5,574,443 | A | 11/1996 | Hsieh |
| 5,581,464 | A | 12/1996 | Woll et al. |
| 5,594,222 | A | 1/1997 | Caldwell |
| 5,614,788 | A | 3/1997 | Mullins |
| 5,619,370 | A | 4/1997 | Guinosso |
| 5,634,709 | A | 6/1997 | Iwama |
| 5,642,299 | A | 6/1997 | Hardin et al. |
| 5,648,835 | A | 7/1997 | Uzawa |
| 5,650,944 | A | 7/1997 | Kise |
| 5,660,454 | A | 8/1997 | Mori et al. |
| 5,661,303 | A | 8/1997 | Teder |
| 5,666,028 | A | 9/1997 | Bechtel et al. |
| 5,668,663 | A | 9/1997 | Varaprasad et al. |
| 5,670,935 | A | 9/1997 | Schofield et al. |
| 5,675,489 | A | 10/1997 | Pomerleau |
| 5,677,851 | A | 10/1997 | Kingdon et al. |
| 5,699,044 | A | 12/1997 | Van Lente et al. |
| 5,724,187 | A | 3/1998 | Varaprasad et al. |
| 5,724,316 | A | 3/1998 | Brunts |
| 5,737,226 | A | 4/1998 | Olson et al. |
| 5,757,949 | A | 5/1998 | Kinoshita et al. |
| 5,760,826 | A | 6/1998 | Nayar |
| 5,760,828 | A | 6/1998 | Cortes |
| 5,760,931 | A | 6/1998 | Saburi et al. |
| 5,760,962 | A | 6/1998 | Schofield et al. |
| 5,761,094 | A | 6/1998 | Olson et al. |
| 5,765,116 | A | 6/1998 | Wilson-Jones et al. |
| 5,781,437 | A | 7/1998 | Wiemer et al. |
| 5,786,772 | A | 7/1998 | Schofield et al. |
| 5,790,403 | A | 8/1998 | Nakayama |
| 5,790,973 | A | 8/1998 | Blaker et al. |
| 5,793,308 | A | 8/1998 | Rosinski et al. |
| 5,793,420 | A | 8/1998 | Schmidt |

(56)            References Cited

U.S. PATENT DOCUMENTS

| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,964,822 A | 10/1999 | Alland et al. |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,009,336 A | 12/1999 | Harris et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,405,132 B1 | 6/2002 | Breed et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,433,817 B1 | 8/2002 | Guerra |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjonell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,246 B1 | 12/2005 | Trudeau |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,046,448 B2 | 5/2006 | Burgner |

(56) References Cited

U.S. PATENT DOCUMENTS

| | | | |
|---|---|---|---|
| 7,062,300 | B1 | 6/2006 | Kim |
| 7,065,432 | B2 | 6/2006 | Moisel et al. |
| 7,085,637 | B2 | 8/2006 | Breed et al. |
| 7,092,548 | B2 | 8/2006 | Laumeyer et al. |
| 7,116,246 | B2 | 10/2006 | Winter et al. |
| 7,123,168 | B2 | 10/2006 | Schofield |
| 7,133,661 | B2 | 11/2006 | Hatae et al. |
| 7,149,613 | B2 | 12/2006 | Stam et al. |
| 7,167,796 | B2 | 1/2007 | Taylor et al. |
| 7,195,381 | B2 | 3/2007 | Lynam et al. |
| 7,202,776 | B2 | 4/2007 | Breed |
| 7,224,324 | B2 | 5/2007 | Quist et al. |
| 7,227,459 | B2 | 6/2007 | Bos et al. |
| 7,227,611 | B2 | 6/2007 | Hull et al. |
| 7,249,860 | B2 | 7/2007 | Kulas et al. |
| 7,253,723 | B2 | 8/2007 | Lindahl et al. |
| 7,255,451 | B2 | 8/2007 | McCabe et al. |
| 7,311,406 | B2 | 12/2007 | Schofield et al. |
| 7,325,934 | B2 | 2/2008 | Schofield et al. |
| 7,325,935 | B2 | 2/2008 | Schofield et al. |
| 7,338,177 | B2 | 3/2008 | Lynam |
| 7,339,149 | B1 | 3/2008 | Schofield et al. |
| 7,344,261 | B2 | 3/2008 | Schofield et al. |
| 7,360,932 | B2 | 4/2008 | Uken et al. |
| 7,370,983 | B2 | 5/2008 | DeWind et al. |
| 7,375,803 | B1 | 5/2008 | Bamji |
| 7,380,948 | B2 | 6/2008 | Schofield et al. |
| 7,388,182 | B2 | 6/2008 | Schofield et al. |
| 7,402,786 | B2 | 7/2008 | Schofield et al. |
| 7,423,248 | B2 | 9/2008 | Schofield et al. |
| 7,423,821 | B2 | 9/2008 | Bechtel et al. |
| 7,425,076 | B2 | 9/2008 | Schofield et al. |
| 7,459,664 | B2 | 12/2008 | Schofield et al. |
| 7,526,103 | B2 | 4/2009 | Schofield et al. |
| 7,541,743 | B2 | 6/2009 | Salmeen et al. |
| 7,561,181 | B2 | 7/2009 | Schofield et al. |
| 7,565,006 | B2 | 7/2009 | Stam et al. |
| 7,616,781 | B2 | 11/2009 | Schofield et al. |
| 7,619,508 | B2 | 11/2009 | Lynam et al. |
| 7,633,383 | B2 | 12/2009 | Dunsmoir et al. |
| 7,639,149 | B2 | 12/2009 | Katoh |
| 7,676,087 | B2 | 3/2010 | Dhua et al. |
| 7,720,580 | B2 | 5/2010 | Higgins-Luthman |
| 7,792,329 | B2 | 9/2010 | Schofield et al. |
| 7,843,451 | B2 | 11/2010 | Lafon |
| 7,855,778 | B2 | 12/2010 | Yung et al. |
| 7,859,565 | B2 | 12/2010 | Schofield et al. |
| 7,881,496 | B2 | 2/2011 | Camilleri et al. |
| 7,914,187 | B2 | 3/2011 | Higgins-Luthman et al. |
| 7,930,160 | B1 | 4/2011 | Hosagrahara et al. |
| 8,017,898 | B2 | 9/2011 | Lu et al. |
| 8,095,310 | B2 | 1/2012 | Taylor et al. |
| 8,098,142 | B2 | 1/2012 | Schofield et al. |
| 8,179,281 | B2 | 5/2012 | Strauss |
| 8,224,031 | B2 | 7/2012 | Saito |
| 9,146,898 | B2 | 9/2015 | Ihlenburg et al. |
| 9,919,705 | B2 | 3/2018 | Ihlenburg et al. |
| 11,279,343 | B2 | 3/2022 | Ihlenburg et al. |
| 11,673,546 | B2 | 6/2023 | Ihlenburg et al. |
| 12,065,136 | B2 | 8/2024 | Ihlenburg et al. |
| 2002/0113873 | A1 | 8/2002 | Williams |
| 2003/0137586 | A1 | 7/2003 | Lewellen |
| 2003/0222982 | A1 | 12/2003 | Hamdan et al. |
| 2005/0219852 | A1 | 10/2005 | Stam et al. |
| 2005/0237385 | A1 | 10/2005 | Kosaka et al. |
| 2006/0018511 | A1 | 1/2006 | Stam et al. |
| 2006/0018512 | A1 | 1/2006 | Stam et al. |
| 2006/0050018 | A1 | 3/2006 | Hutzel et al. |
| 2006/0091813 | A1 | 5/2006 | Stam et al. |
| 2006/0103727 | A1 | 5/2006 | Tseng |
| 2006/0250501 | A1 | 11/2006 | Widmann et al. |
| 2006/0254142 | A1 | 11/2006 | Das et al. |
| 2007/0104476 | A1 | 5/2007 | Yasutomi et al. |
| 2007/0109406 | A1 | 5/2007 | Schofield et al. |
| 2007/0120657 | A1 | 5/2007 | Schofield et al. |
| 2007/0242339 | A1 | 10/2007 | Bradley |
| 2008/0147321 | A1 | 6/2008 | Howard et al. |
| 2008/0192132 | A1 | 8/2008 | Bechtel et al. |
| 2009/0113509 | A1 | 4/2009 | Tseng et al. |
| 2009/0160987 | A1 | 6/2009 | Bechtel et al. |
| 2009/0190015 | A1 | 7/2009 | Bechtel et al. |
| 2009/0198412 | A1 | 8/2009 | Shiraki |
| 2009/0256938 | A1 | 10/2009 | Bechtel et al. |
| 2010/0164752 | A1* | 7/2010 | Stahlin ............. G08G 1/096775 |
| | | | 713/168 |
| 2010/0250106 | A1 | 9/2010 | Bai et al. |
| 2011/0032119 | A1 | 2/2011 | Pfeiffer et al. |
| 2012/0045112 | A1 | 2/2012 | Lundblad et al. |
| 2012/0150425 | A1* | 6/2012 | Chapman ............. G08G 1/0129 |
| | | | 701/119 |

FOREIGN PATENT DOCUMENTS

| | | | |
|---|---|---|---|
| EP | 0788947 | A1 | 8/1997 |
| JP | 59114139 | | 7/1984 |
| JP | 6080953 | | 5/1985 |
| JP | 6079889 | | 10/1986 |
| JP | 6272245 | | 5/1987 |
| JP | 6414700 | | 1/1989 |
| JP | 4114587 | B2 | 4/1992 |
| JP | 0577657 | | 3/1993 |
| JP | 05050883 | | 3/1993 |
| JP | 5213113 | | 8/1993 |
| JP | 6227318 | B2 | 8/1994 |
| JP | 06267304 | | 9/1994 |
| JP | 06276524 | | 9/1994 |
| JP | 06295601 | | 10/1994 |
| JP | 07004170 | | 1/1995 |
| JP | 0732936 | | 2/1995 |
| JP | 0747878 | | 2/1995 |
| JP | 07052706 | | 2/1995 |
| JP | 0769125 | | 3/1995 |
| JP | 07105496 | | 4/1995 |
| JP | 2630604 | | 7/1997 |
| JP | 200383742 | A | 3/2003 |

OTHER PUBLICATIONS

Tokimaru et al., "CMOS Rear-View TV System with CCD Camera", National Technical Report vol. 34, No. 3, pp. 329-336, Jun. 1988 (Japan).

J. Borenstein et al., "Where am I? Sensors and Method for Mobile Robot Positioning", University of Michigan, Apr. 1996, pp. 2, 125-128.

Bow, Sing T., "Pattern Recognition and Image Preprocessing (Signal Processing and Communications)", CRC Press, Jan. 15, 2002, pp. 557-559.

Vlacic et al. (Eds), "Intelligent Vehicle Tecnologies, Theory and Applications", Society of Automotive Engineers Inc., edited by SAE International, 2001.

Van Leuven et al., "Real-Time Vehicle Tracking in Image Sequences", IEEE, US, vol. 3, May 21, 2001, pp. 2049-2054, XP010547308.

Van Leeuwen et al., "Requirements for Motion Estimation in Image Sequences for Traffic Applications", IEEE, US, vol. 1, May 24, 1999, pp. 145-150, XP010340272.

Van Leeuwen et al., "Motion Estimation with a Mobile Camera for Traffic Applications", IEEE, US, vol. 1, Oct. 3, 2000, pp. 58-63.

Van Leeuwen et al., "Motion Interpretation for In-Car Vision Systems", IEEE, US, vol. 1, Sep. 30, 2002, p. 135-140.

Pratt, "Digital Image Processing, Passage—ED.3", John Wiley & Sons, US, Jan. 1, 2001, pp. 657-659, XP002529771.

* cited by examiner

TABLE 1

| Influence level | Object A | Object B | Object C | Object D | Object D |
|---|---|---|---|---|---|
| speed metric | 5 | 5 | 4 | 2 | 2 |
| vehicle type metric - hazard | 10 | 9 | 14 | 3 | 3 |
| vehicle type metric - vulnerability | 6 | 9 | 4 | 30 | 0 |
| distance metric | 6 | 6 | 10 | 5 | 20 |
| Sum | 27 | 29 | 32 | 40 | 25 |

FIG. 12

TABLE 2

| speed metric | interval | | influence level add on |
|---|---|---|---|
| stopped | 0..3 | km/h | 2 |
| very low | 3..15 | km/h | 3 |
| low | 15..30 | km/h | 4 |
| medium | 30..60 | km/h | 5 |
| fast | 60..130 | km/h | 6 |
| high | 130..170 | km/h | 7 |
| very high | >170 | km/h | 8 |

FIG. 13

TABLE 3

|  | influence level add on | |
| --- | --- | --- |
| object/ vehicle type metric | hazard (mass and size) | vulnerability |
| pedestrian | 3 | 30 |
| cyclist | 4 | 23 |
| motor cyclist | 4 | 17 |
| small car | 8 | 13 |
| midsize car | 9 | 9 |
| large car | 10 | 6 |
| truck | 14 | 4 |
| road train | 18 | 3 |
| train | 25 | 2 |
| curbstone | 3 | 0 |
| pole | 5 | 2 |
| bush | 3 | 3 |
| tree | 6 | 3 |
| grass | 0 | 2 |
| boundary strip | 0 | 1 |
| lane marker strip | 0 | 1 |
| barrier | 6 | 3 |
| • • • | | |

FIG. 14

TABLE 4

| distance metric | interval | | influence level add on |
|---|---|---|---|
| extremely close | 0..0,4 | m | 50 |
| very close | 0,4..1 | m | 20 |
| quite close | 1..1,8 | m | 16 |
| nearby | 1,8..3 | m | 13 |
| in the near | 3..10 | m | 10 |
| near distance | 10..20 | m | 8 |
| in a distance | 20..40 | m | 6 |
| quite far | 40..80 | m | 5 |
| far | 80..150 | m | 4 |
| very far | 150..300 | m | 3 |
| in sight | 300..500 | m | 2 |
| nearly visuable distant | >500 | m | 1 |
| • • • | | | |

FIG. 15

TABLE 5 intended path conflict metric

| will be.. | interval [m] | influence value | in a time less than.. [s] | | | | | | | | | | | | | | | | | | | |
|---|---|---|---|---|---|---|---|---|---|---|---|---|---|---|---|---|---|---|---|---|---|---|
| | | | 0,2 | 0,4 | 0,6 | 0,8 | 1 | 1,2 | 1,4 | 1,8 | 2 | 2,5 | 3 | 4 | 5 | 7 | 9 | 12 | 15 | 20 | 25 | 30 |
| *(influence value)* | | | *10* | *8* | *7* | *6* | *5* | *4* | *4* | *3* | *3* | *2* | *2* | *2* | *2* | *1* | *1* | *1* | *1* | *1* | *0* | *0* |
| extremely close | 0..0,4 | 10 | 100 | 80 | 70 | 60 | 50 | 40 | 40 | 30 | 30 | 20 | 20 | 20 | 20 | 10 | 10 | 10 | 10 | 10 | 0 | 0 |
| very close | 0,4..1 | 8 | 80 | 64 | 56 | 48 | 40 | 32 | 32 | 24 | 24 | 16 | 16 | 16 | 16 | 8 | 8 | 8 | 8 | 8 | 0 | 0 |
| quite close | 1..1,8 | 7 | 70 | 56 | 49 | 42 | 35 | 28 | 28 | 21 | 21 | 14 | 14 | 14 | 14 | 7 | 7 | 7 | 7 | 7 | 0 | 0 |
| nearby | 1,8..3 | 6 | 60 | 48 | 42 | 36 | 30 | 24 | 24 | 18 | 18 | 12 | 12 | 12 | 12 | 6 | 6 | 6 | 6 | 6 | 0 | 0 |
| in the near | 3..10 | 5 | 50 | 40 | 35 | 30 | 25 | 20 | 20 | 15 | 15 | 10 | 10 | 10 | 10 | 5 | 5 | 5 | 5 | 5 | 0 | 0 |
| near distance | 10..20 | 4 | 40 | 32 | 28 | 24 | 20 | 16 | 16 | 12 | 12 | 8 | 8 | 8 | 8 | 4 | 4 | 4 | 4 | 4 | 0 | 0 |
| in a distance | 20..40 | 3 | 30 | 24 | 21 | 18 | 15 | 12 | 12 | 9 | 9 | 6 | 6 | 6 | 6 | 3 | 3 | 3 | 3 | 3 | 0 | 0 |
| quite far | 40..80 | 2 | 20 | 16 | 14 | 12 | 10 | 8 | 8 | 6 | 6 | 4 | 4 | 4 | 4 | 2 | 2 | 2 | 2 | 2 | 0 | 0 |
| far | 80..150 | 1 | 10 | 8 | 7 | 6 | 5 | 4 | 4 | 3 | 3 | 2 | 2 | 2 | 2 | 1 | 1 | 1 | 1 | 1 | 0 | 0 |
| very far | 150..300 | 1 | 10 | 8 | 7 | 6 | 5 | 4 | 4 | 3 | 3 | 2 | 2 | 2 | 2 | 1 | 1 | 1 | 1 | 1 | 0 | 0 |
| in sight | 300..500 | 1 | 10 | 8 | 7 | 6 | 5 | 4 | 4 | 3 | 3 | 2 | 2 | 2 | 2 | 1 | 1 | 1 | 1 | 1 | 0 | 0 |
| nearly visuable distant | >500 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 16

VEHICULAR MULTI-SENSOR SENSING SYSTEM

CROSS REFERENCE TO RELATED APPLICATIONS

The present application is a continuation of U.S. patent application Ser. No. 18/332,812, filed Jun. 12, 2013, now U.S. Pat. No. 12,065,136, which is a continuation of U.S. patent application Ser. No. 17/655,381, filed Mar. 18, 2022, now U.S. Pat. No. 11,673,546, which is a continuation of U.S. patent application Ser. No. 15/924,892, filed Mar. 19, 2018, now U.S. Pat. No. 11,279,343, which is a continuation of U.S. patent application Ser. No. 14/867,069, filed Sep. 28, 2015, now U.S. Pat. No. 9,919,705, which is a continuation of U.S. patent application Ser. No. 13/660,306, filed Oct. 25, 2012, now U.S. Pat. No. 9,146,898, which claims the filing benefits of U.S. provisional application Ser. No. 61/552,167, filed Oct. 27, 2011, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data that is processed and, responsive to such image processing and responsive to other information pertaining to the driving condition or surrounding environment or traffic at or near the vehicle, a vehicle safety or alert system is operable to provide an appropriate vehicle safety feature or alert that may vary depending on the environment or traffic surrounding the vehicle.

According to an aspect of the present invention, a driver assist system for a vehicle includes an object detection sensor disposed at the subject vehicle and having an exterior field of view, and a receiver disposed at the subject vehicle and operable to receive a wireless communication from a communication device remote from the subject vehicle. The wireless communication is associated with at least one of (i) a driving condition of another vehicle and (ii) a road condition of interest to the driver of the subject vehicle (and the condition may be near or at the subject vehicle or remote from the subject vehicle, such as forward of the subject vehicle along the road being traveled by the subject vehicle and potentially outside of the field of view of the sensor of the driver assist system). The driver assist system includes a control operable to process data captured by the object detection sensor to detect an object approaching the subject vehicle. The driver assist system is operable to adjust the processing of the data responsive at least in part to the wireless communications received by the receiver. The driver assist system is operable to generate an alert to alert the driver of the subject vehicle of a potential hazard responsive to the processing of the data. Optionally, a system of the vehicle (such as a braking system or a steering system or a collision avoidance system or the like) may be operable to intervene with or control a vehicle function to mitigate or avoid a potential hazard responsive to the processing of the data.

Optionally, the control may adjust the processing of the data to a distant mode of processing responsive to the wireless communication being indicative of an object approaching the subject vehicle from a distance near the effective range of the object detection sensor, and with the distant mode processing of the data focuses on an area at which it is determined that the object approaching the subject vehicle is located. Optionally, the control may adjust the processing of the data to a nearby mode of processing responsive to the object detection sensor detecting an object of interest near to and approaching the subject vehicle, with the nearby mode of processing of the data focuses on an area at which the detected object of interest is located.

Optionally, the driver assist system may be operable to alert the driver of the subject vehicle to not open a vehicle door when the subject vehicle is parked and when the driver assist system detects a vehicle approaching the subject vehicle in a side lane adjacent to the subject vehicle. The driver assist system may alert the driver of the subject vehicle to not open the vehicle door responsive to the detected approaching vehicle being within a threshold distance of the subject vehicle, and the control may adjust or alter the threshold distance parameter responsive to at least one of (i) a distance from the subject vehicle to the detected approaching vehicle, (ii) a speed of the detected approaching vehicle and (iii) an environment in which the subject vehicle is parked.

These and other objects, advantages, purposes and features of the present invention will become apparent upon review of the following specification in conjunction with the drawings.

BRIEF DESCRIPTION OF THE DRAWINGS

FIG. 9 is a perspective view of a bus leaving a bus station or the like;

FIG. 12 is a table (Table 1) showing a ranking scheme;

FIGS. 13-15 are tables (Tables 2-4, respectively) showing sub tables of speed metrics, object/vehicle type metrics and distance metrics, respectively, and the respective influence level add ons; and FIG. 16 is a table (Table 5) showing intended path conflict metrics and times and influence values.

DESCRIPTION OF THE PREFERRED EMBODIMENTS

Figure 1:
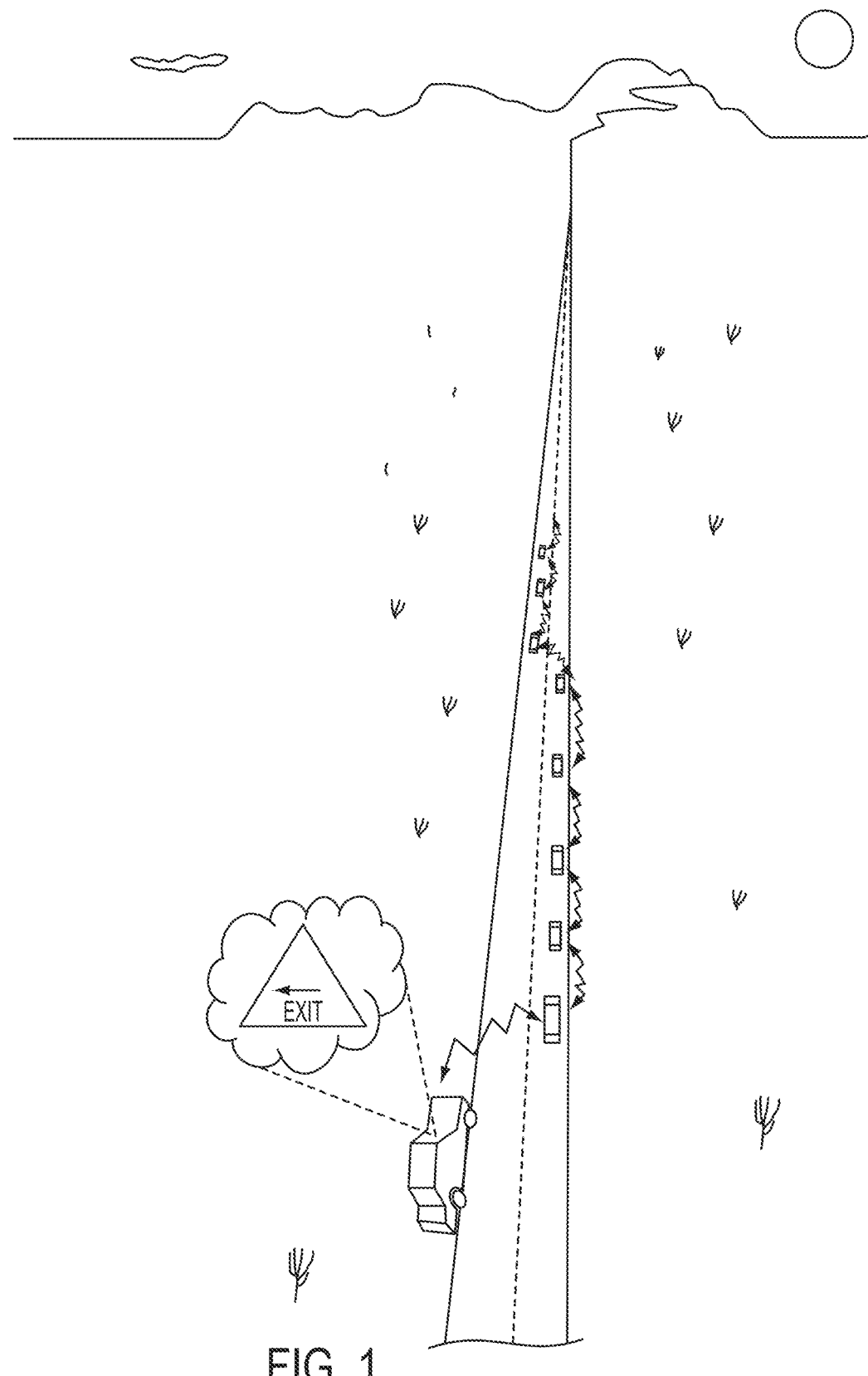
FIG. 1 is a perspective view of a vehicle receiving car to car communications that provide information about incoming traffic in accordance with the present invention.

A driver assist system and/or vision system and/or alert system may operate to supervise a passenger car's environment, such as the environment surrounding a just stopped car with occupants still inside, to determine potential hazards due to surrounding traffic by detecting the traffic or other objects at or near the stopped vehicle, evaluating their shape, tracking their paths of travel to determine their travel paths or trajectories for deciding whether the detected vehicle or object may potentially collide with an occupant of the subject vehicle if the occupant attempts to open a vehicle door, whereby the system, upon making a determination that a potential collision may occur, may take safety measures, such as generating an alert, such as an audible warning sound or alert, a door handle vibration or locking/braking the door or the like (such as by utilizing aspects of the system described in U.S. Pat. No. 7,586,402, which is hereby incorporated herein by reference in its entirety). The supervision may be accomplished by various vehicle-based sensors, such as ultrasonic sensors, RADAR, LIDAR, time of flight (TOF) sensors and/or cameras and/or the like disposed at the subject vehicle and having exterior fields of view. The system may include seat sensors or the like for determining seat occupancy, such as by utilizing aspects of the system described in U.S. Pat. Publication No. US 2009/0033477, which is hereby incorporated herein by reference in its entirety. It is known for such systems to also detect not moving obstacles, such as a sign or lantern pole or the like, and to provide an alert or warning to the occupant or to intervene to avoid colliding with the detected object.

With such alert systems, the systems often provide warnings that are not necessary or desired due to the particular driving condition or environment in which the subject vehicle is being driven or parked. Thus, an alert system should provide warnings when appropriate to avoid bothering the driver and/or occupant(s) of the vehicle, while providing a safety feature that is beneficial to the driver and/or occupants of the vehicle.

The system of the present invention thus detects potential hazards or conditions or the like and analyzes detected objects (such as traffic or the like) and tracks the detected objects to provide proper hazard anticipations and to avoid misleading or inappropriate interventions and warnings.

The present invention provides an object or obstacle and traffic supervision and vision system working in an end user productive manner. The driver assist system of the present invention includes a control or processor that receives inputs from one or more sensors of a vehicle, such as multiple object detection sensors, including the likes of ultrasonic sensors, radar sensors, laser sensors, lidar sensors, imaging sensors, occupancy sensors (such as seat or cabin occupant detection sensors or the like), rain sensors, traction sensors (such as for an electronic traction control system (ETS) or an acceleration slip reduction (ASR) system or the like) and/or the like. The system may also receive information or inputs from (and be responsive to) information from other systems, such as infotainment systems, navigation systems, telematics systems and the likes, and/or systems of other vehicles and/or other remote systems, such as may be received from a satellite communication and may include information pertaining to other vehicles on the road at or near the subject vehicle (such as wireless communications from and/or pertaining to other vehicles on the road, such as wireless communications as part of smart vehicle communications systems of the types proposed for use in Europe), such as car-to-car systems or car-to-x systems or car-to-device systems (where the device may comprise a communication device or system of another vehicle or a communication device or system disposed at or along a road or other area travelled by vehicles or a satellite communication device or system or the like). The communication may be based on any suitable communication protocol or system, such as WLAN, BLUETOOTH® or the like, or by infrared data transmission (FM) or sub carried by (two) vehicle RADAR, such as by utilizing aspects of the system described in U.S. Pat. No. 7,315,239, which is hereby incorporated herein by reference in its entirety.

So far unknown is to realize a car-to-car communication by a sub carried transmission via a time of flight flash light (TOF) system. The TOF system comprises a light source or flash light (that is intermittently operable to flash at a selected pulse or rate) and a light sensor. The light source mainly serves to emit light flashes, which are reflected by its environment. As the distances to reflecting objects increases to longer distances, the time for the light to reach the light sensor increases. By that a 3D space reconstruction is possible. To utilize the light flashes as a data transmit system the flashes must be emitted in a time pattern (pulse widths or wavelength modulation may be difficult). Hereby usual pulse distance or pulse phase modulation codes may come into use. At the time two vehicles equipped with such communication capable TOF systems come into each other's field of reach or communication, the communication may initialize automatically. During the initialization, there may be a handshake mode in which transmission and measuring time patterns are set up to minimize the data collisions and disturbing influences when both systems are flashing at the same time.

Figure 7:
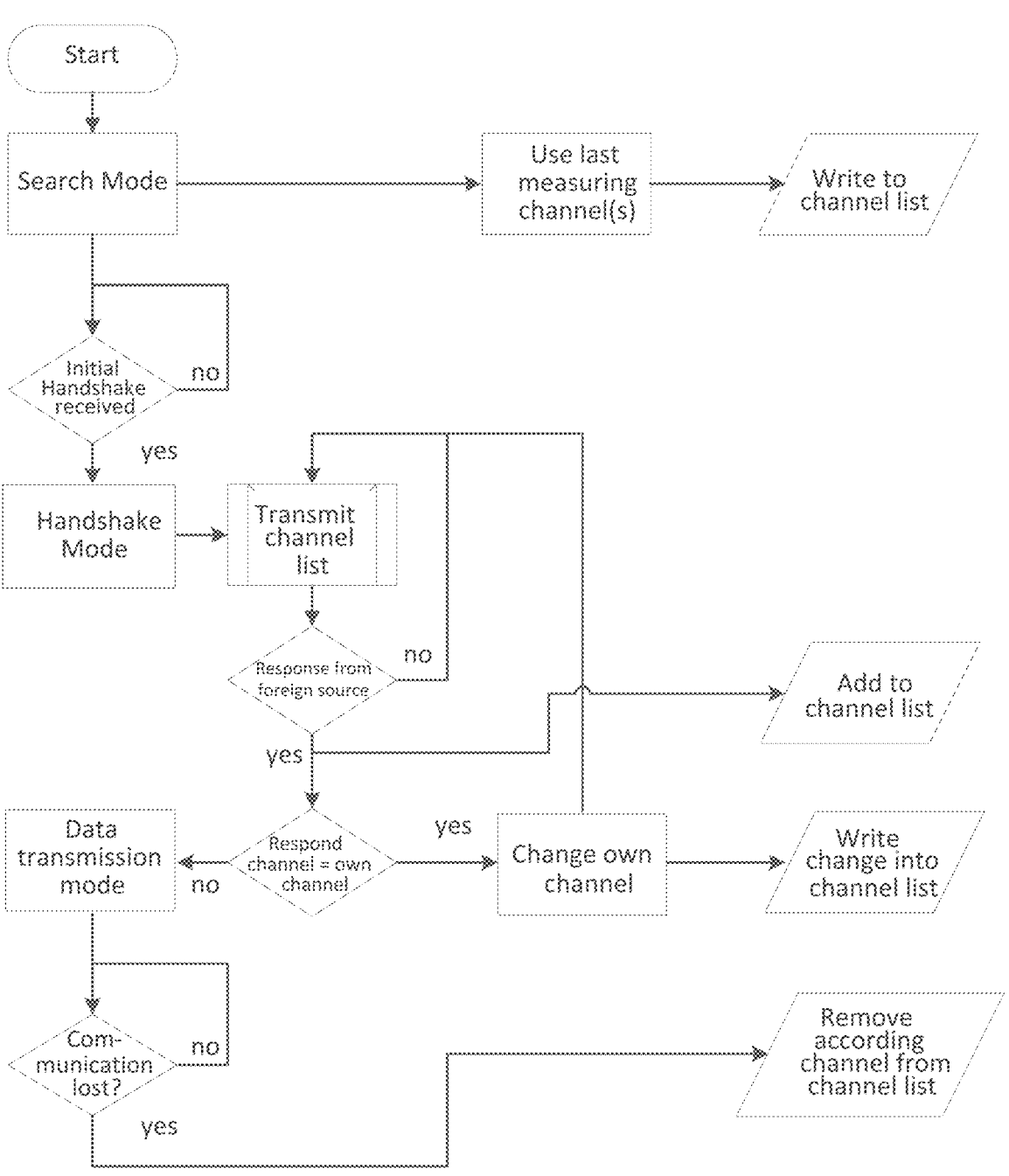
FIG. 7 is a schematic of a workflow when utilizing a time of flight (TOF) sensor system (such as a TOF 3D sensor system) with flash light as a time pattern based communication device, shown with three modes 'search', 'handshake' and data transmission, such that when two vehicles with TOF are measuring instantaneous, both measurings may be disturbed by the other, which is why the measuring channel, which is a time slot in a time pattern, may be chosen different for the two channels, and the detection eventual change of one system's channel includes this workflow.
Figure 8:
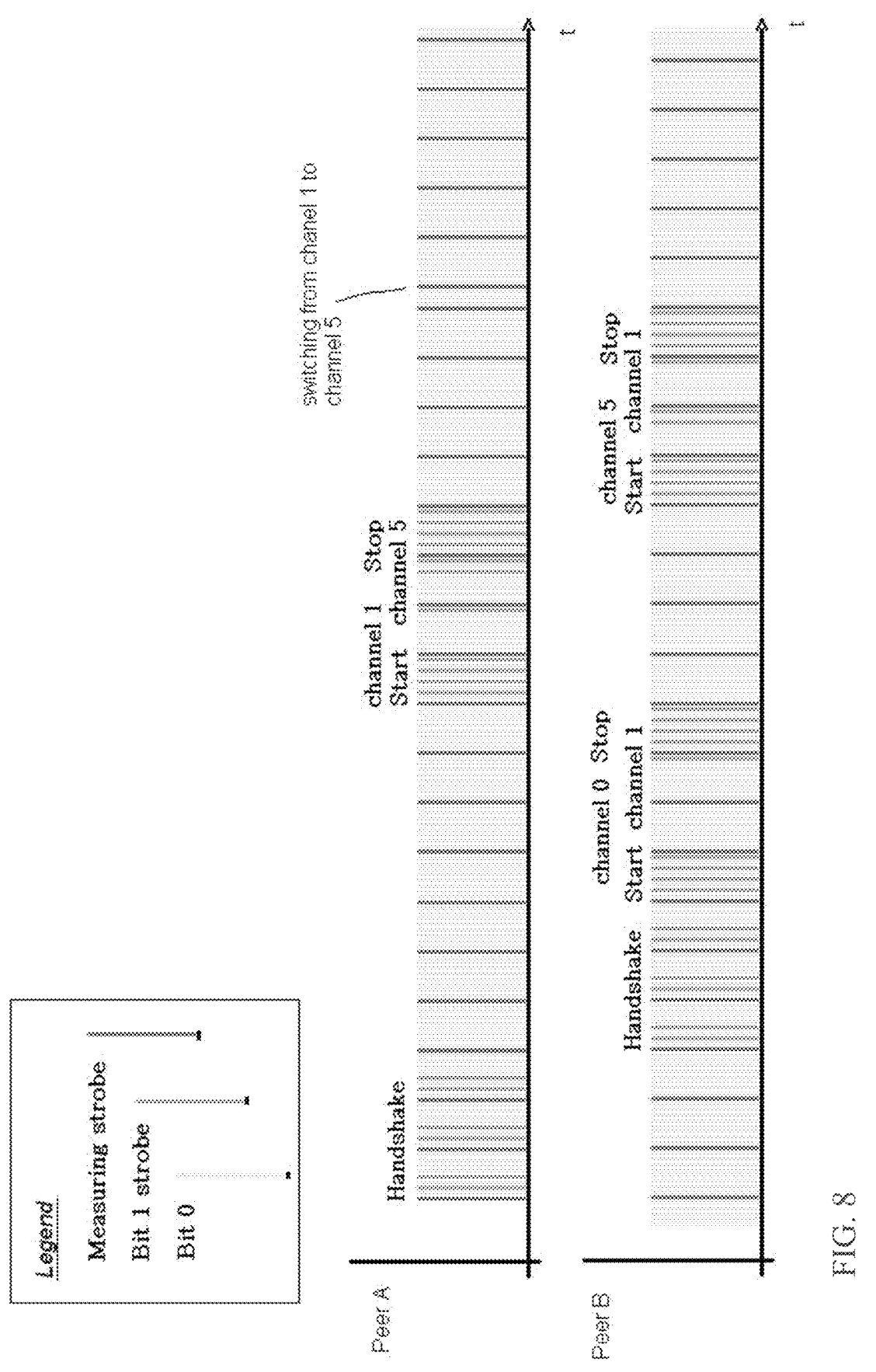
FIG. 8 shows in bit level detail how the duplex time pattern of two TOF communication devices may be set up, where, in this example, peer B transmits its chosen measuring channel to peer A and peer A confirms peer B's channel and communicates peer A's newly chosen channel, whereby peer B confirms and after that more individual data may be transmitted.

An example of the described workflow is shown in FIG. 7. In FIG. 8, an example of a time coded TOF communication initialization procedure on bit level is shown. First there is a handshake phase followed by a channel change since both systems ran instantaneous on the same measuring cycle. Channels are defined by consecutive time windows.

Optionally, a data communication may alternatively be sub carried via a structured light flash system instead of a TOF flash system.

The data exchange may comprise several nodes for either vehicles or infrastructure.

The system may utilize GPS information and/or data and/or satellite images and/or road maps or road data or the like, and/or may utilize cell phone localization methods, such as for detecting high traffic volume, average car speed and the like to determine when there are traffic jams or excessive or slow moving traffic at or near the subject vehicle.

The system may utilize other information, such as information wirelessly communicated from other vehicles and/or from communication systems associated with the road system or infrastructure (such as information communicated in response to sensors at intersections or along roadways or the like) and/or map data and the like, to provide instructions to the driver of the subject vehicle to assist the driver in bypassing detected traffic jams. For example, the system may receive information or data or inputs from host-based systems or accessories (such as a WLAN or Ethernet via a mobile phone or telematics system or the like) or from inter car communications (such as, for example, Daimler's Dedicated Short Range Communication or other smart vehicle communication systems and the like) and may use such information for setting up network grids (such as via Zigbee or the like) with vehicles ahead of and/or behind the subject vehicle or vehicles in opposing traffic or the like. For example, economic drive systems/algorithm may provide anticipation of upcoming traffic situations to provide early warning to the driver (possibly before the traffic condition is detectable by the vehicle-based or on-board sensors of the subject vehicle) so that the driver (or the system) can reduce the speed of the subject vehicle before it approaches the traffic situation. The system may also or otherwise receive information wirelessly from the likes of remote immobile supervision systems, such as monitoring or supervision systems at or in tunnels, traffic lights on intersections, and/or parking lots and/or the like.

For example, and with reference to FIG. 1, a car-to-car communication system or the like may communicate information to the system about approaching traffic. Such traffic information or environment information and the subject vehicle's position and speed of travel provide or define the context state or driving condition/environment of the subject vehicle (such as a vehicle parked or broken down at the side of a road). Responsive to such information, the system of the present invention may, responsive to a detection of or receipt of information indicative of traffic flow or approaching traffic or a traffic jam or accident or the like, provide an alert to the driver (such as a warning sign or driving instruction at a display in the subject vehicle) that, for example, directs the occupants of the subject vehicle to not step out of the broken down or parked vehicle in the direction of the road's traffic (such as shown as a warning or exit sign in FIG. 1, with the arrow in the warning sign pointing in a direction that leads the subject vehicle's occupants away from the detected approaching or closing traffic).

Any and/or all of the above inputs or systems may be fully or partially combined for the purpose of composing a current status of the vehicle's immediate or direct and further environment, so that the system knows the "context" or environment in which the vehicle is travelling. This context can be used to digitally switch or analogue alter the detection mode, view filters, display or warning condition or parameters or the like of a vision system and interacting or depending car systems (such as a power mode or other safety device condition such as the door locks (first, second detent and opening mode or first and second stroke opening and the like), window lifter, sun roof, folding top, brakes, parking brake, lighting, alarms, and/or the like).

Due to the high data rates and short image sampling rates of a vehicle vision or imaging system, the processing capacity of the vision system is limited. Higher processing capacity requires more expensive hardware, so it is desirable to instead utilize the processing capacity in an efficient and effective manner. For example, it is desirable to only process what is needed at any given moment, and thus such processing should be context dependent so that information that is needed for the specific environment or conditions surrounding the vehicle at that time is processed, but other information or data is not processed or processed at a lesser level. Typically, such processing of image data by a vision control may be adjusted in terms of resolution, frames per second, detection and tracking rates, and/or the like.

The above mode/filter switching/altering methodology or system or process may be used to control or adjust the image processing or alert generation or the like. If multiple tasks or criteria are used, the various inputs or criteria may be weighted or processed in a weighted manner according the context related priority. For example, if the vehicle is parked, information or data pertaining to traffic in the lane adjacent to the subject vehicle may be processed more than information or data pertaining to vehicles in front of or to the rear of the subject vehicle, in order to provide an alert to the driver or passenger of the vehicle if it is not safe to open a door of the vehicle to exit the vehicle.

Figure 6:
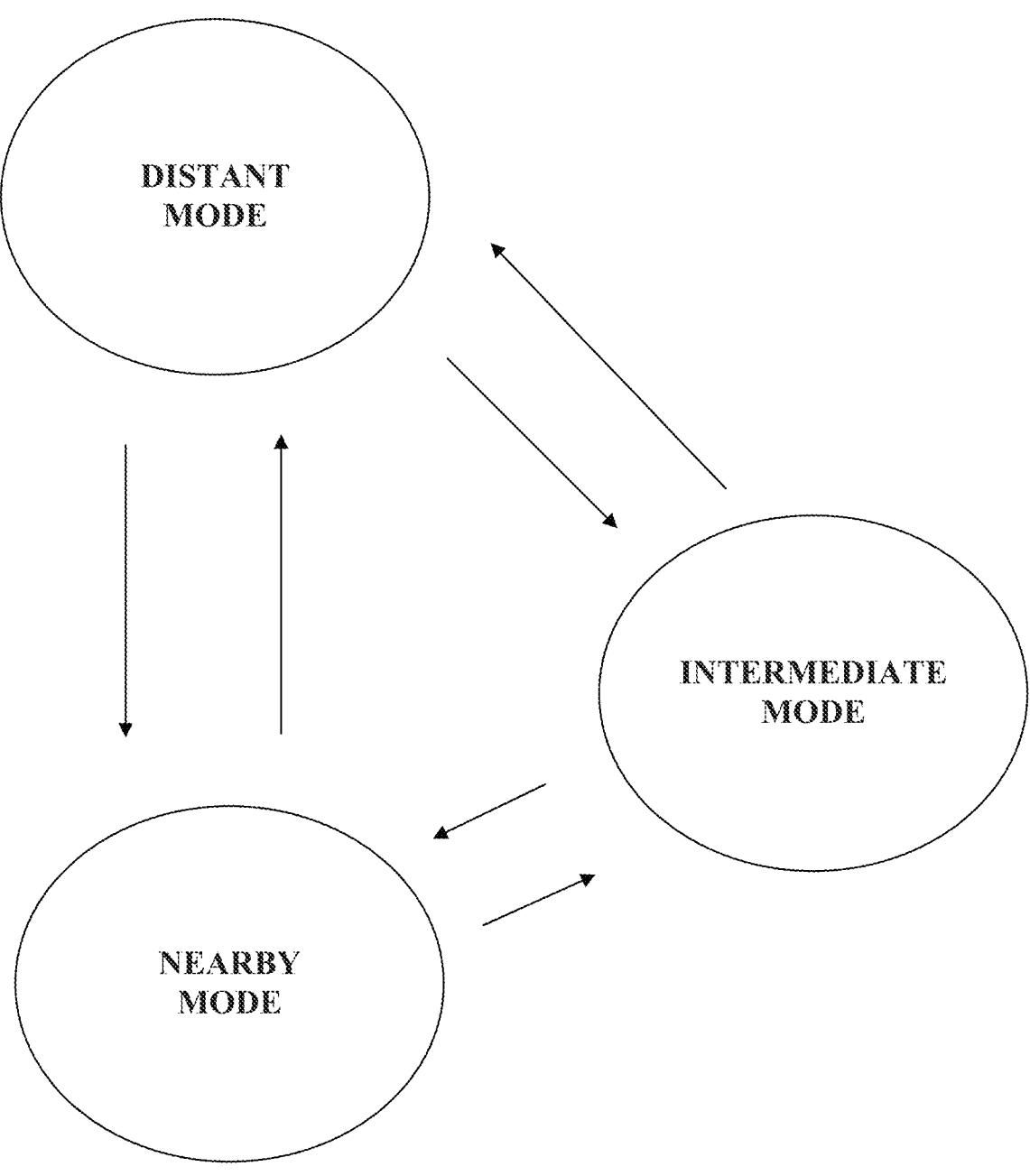
FIG. 6 is a schematic of a camera/vision filter mode switching that is context dependent in accordance with the present invention.

The driver assist system or alert system of the present invention thus may, for example, provide an indication or warning or alert or the like to occupants in the vehicle such that the occupant or occupants are indicated and/or visualized and/or warned to not open a door into traffic such as on a highway with cars approaching in a lane adjacent to the subject vehicle at a high speed, but the system can determine when detected objects are not a potential hazard and will not bother or alert the occupants when the occupant or occupants are exiting the vehicle at times when the traffic is going very slow such as in a traffic jam or traffic stand still or the like, even if at the same or similar location on a highway or other roadway. It is also envisioned that the system may be responsive to other context dependent situations and that the driver's attention can be directed to different aspects of different situations. For example, when driving or parked along a road or highway, the system may operate in an "intermediate mode" or "distant mode" (FIG. 6), where the system processes information pertaining to objects or vehicles at an intermediate or far distance from the subject vehicle (where the detected objects may be travelling at a higher rate of speed or at a high rate of speed relative to the subject vehicle), but when the subject vehicle is being driven or parked on a road within city limits (where the traffic may be travelling slower), the hazard detection, visualization, warning and intervention functions of the vision system may be switched or adjusted to a "nearby mode", and may process information or data to detect smaller or slower moving or non-moving objects, such as a cyclist or street light pole or the like at or near the subject vehicle, and may alert the occupant of the vehicle to not open a door at a time when opening the door may result in potentially hitting a cyclist or street light pole or curb or the like.

Figure 2:
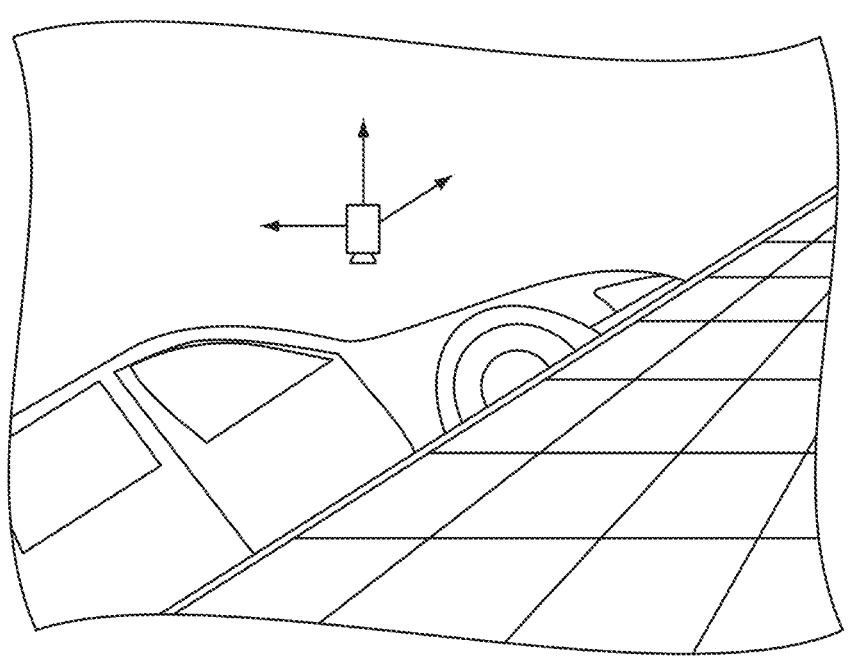
FIG. 2 is a perspective view of a vehicle parking at or near a curb, shown with a virtual camera positioned by the system to aid the driver while narrowing the curb.
Figure 3:
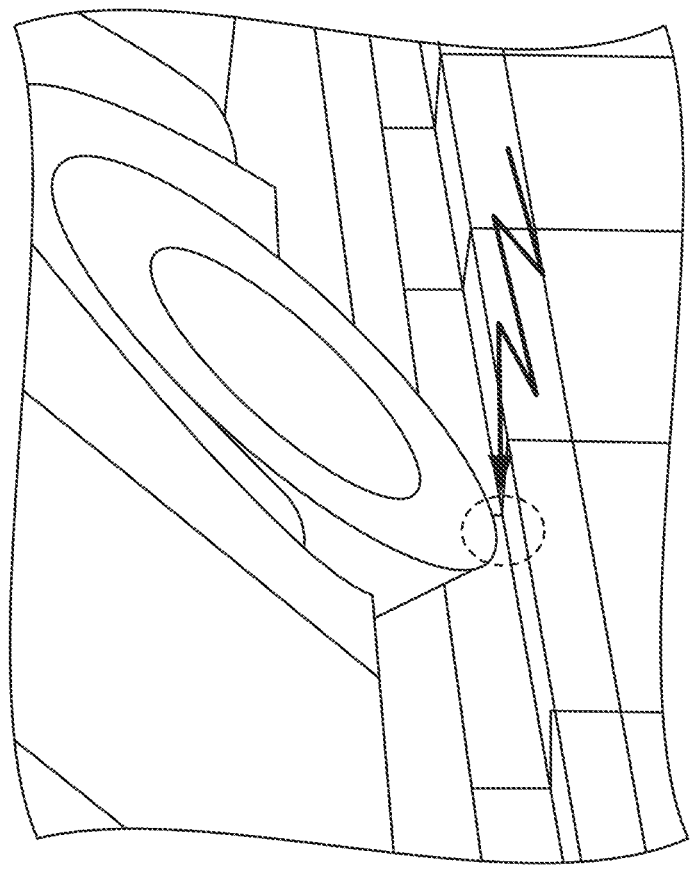
FIG. 3 is a perspective view of the vehicle wheel and curb of FIG. 2, as provided by a virtual vehicle camera positioned as like shown in FIG. 2 responsive to a determination that the vehicle is parking at or near a curb in accordance with the present invention.

For example, and with reference to FIGS. 2 and 3, the system may determine when the vehicle is being parked at a curb side of a road or street and may provide a display or alert as to where the tires of the vehicle are relative to the curb. As shown in FIGS. 2 and 3, a vehicle camera (although shown in FIG. 2 as a camera remote from the vehicle, the camera may comprise a vehicle-based camera, such as a side camera at or near or in an exterior rearview mirror assembly of the vehicle or the like, with an exterior field of view that is generally sidewardly of the vehicle and optionally forwardly and/or rearwardly of the vehicle) may be adjusted (or a display may be adjusted) to automatically view the curb and provide a display of the curb to the driver of the vehicle or otherwise alert the driver when the tires of the vehicle approach the curb to assist the driver in parking the vehicle alongside the curb. As shown in FIG. 2, the vehicle is in the process of parking in or close to the curb at the side of the road. The vehicle camera view may be adjusted context dependent. Thus, because the system is operable (such as via image processing or the like) to detect that the vehicle is being parked (a curb side parking context), the camera and/or display is/are adjusted to view the curb at or near the tires, which is the most significant view at that time and context. The vision filter or mode may be set to the nearby mode in such a context, such that information or data pertaining to or associated with objects or vehicles distant from the subject vehicle are processed at a reduced level or not processed at all.

Optionally, the system may provide a view of one object, or if multiple objects (such as a front tire and a rear tire at a curb) are of interest to the driver of the vehicle, the system may provide a dual display (such as half of a display screen used to show one tire at the curb and the other half of the display screen used to show another tire at the curb). The system may thus split the view to show or process two or more significant objects or the field of view of the camera may be de-zoomed to capture two or more significant objects together in one view or captured image. The camera or cameras may be part of a vehicle vision system and may comprise a plurality of cameras, and the vision system (utilizing a rearward facing camera and sidewardly facing cameras and a forwardly facing cameras disposed at the vehicle) may provide a display of a top-down view or birds-eye view of the vehicle or a surround view at the vehicle, such as by utilizing aspects of the vision systems described in PCT Application No. PCT/US10/25545, filed Feb. 26, 2010 and published Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or U.S. patent application Ser. No. 13/333,337, filed Dec. 21, 2011 and published Jun. 28, 2012 as U.S. Publication No. US-2012-0162427, and/or U.S. provisional application Ser. No. 61/678,375, filed Jan. 20, 2012, and/or PCT Application No. PCT/CA2012/000378, filed Apr. 25, 2012 and published Nov. 1, 2012 as International Publication No. WO 2012/145822, which are hereby incorporated herein by reference in their entireties.

When the vehicle is driven outside of the city limits (which the system may determine responsive to image processing or GPS data or the like), the system may switch to the distant mode to detect more distant objects approaching the subject vehicle, so to early detect, track, zoom and anticipate the speed and trajectory and eventually the intentions of a detected approaching object or vehicle, so that the system may alert or warn the driver of a potential hazard or intervene to avoid a potential hazard (such as via automatically reducing the speed of the subject vehicle or the like). As discussed above, early detection of an upcoming object may be supported by knowledge of its presence or approach as received from a remote communication source (that may provide information pertaining to or associated with vehicles on the road or the like).

Optionally, the system may be operable to classify and 'label' or identify one or multiple object(s) and to set the speed and trajectory parameters and 'matha' properties to rank their hazardous potential or influence, such as suggested in U.S. provisional application Ser. No. 61/696,416, filed Sep. 4, 2012, which is hereby incorporated herein by reference in its entirety, even when the detected object is far from the subject vehicle and still a "spot" on the horizon, and when detection systems such as radar, laser and cameras are still unable to determine such parameters of the distant object. This hazardous influence ranking may be done by taking the speed, the distance, the size, the mass and the deformability and vulnerability of the subject vehicles or objects into account. There may be a look up table of each object's property influence value in use. In order to avoid overwhelming the driver with too many object's information and data, there may be a certain level of influence or a limited number of objects with the highest ranking which become brought to the driver's attention. In the example of such a ranking scheme shown in Table 1 (with Tables 2-4 showing sub tables of the used metrics) the gray deposited values are these of the three with the highest ranking value which would be the data of choice. When the vehicles' desired destinations are known due to data transmission, the intended paths can become predetermined. Imminent colliding hazards become conceivable by projecting the vehicle's path trajectories into the future (see Table 5). As Mehta information, the local traffic rules may be regarded by the rating algorithms as well as when choosing the ranking of the information which will become presented to the driver.

Figure 9:
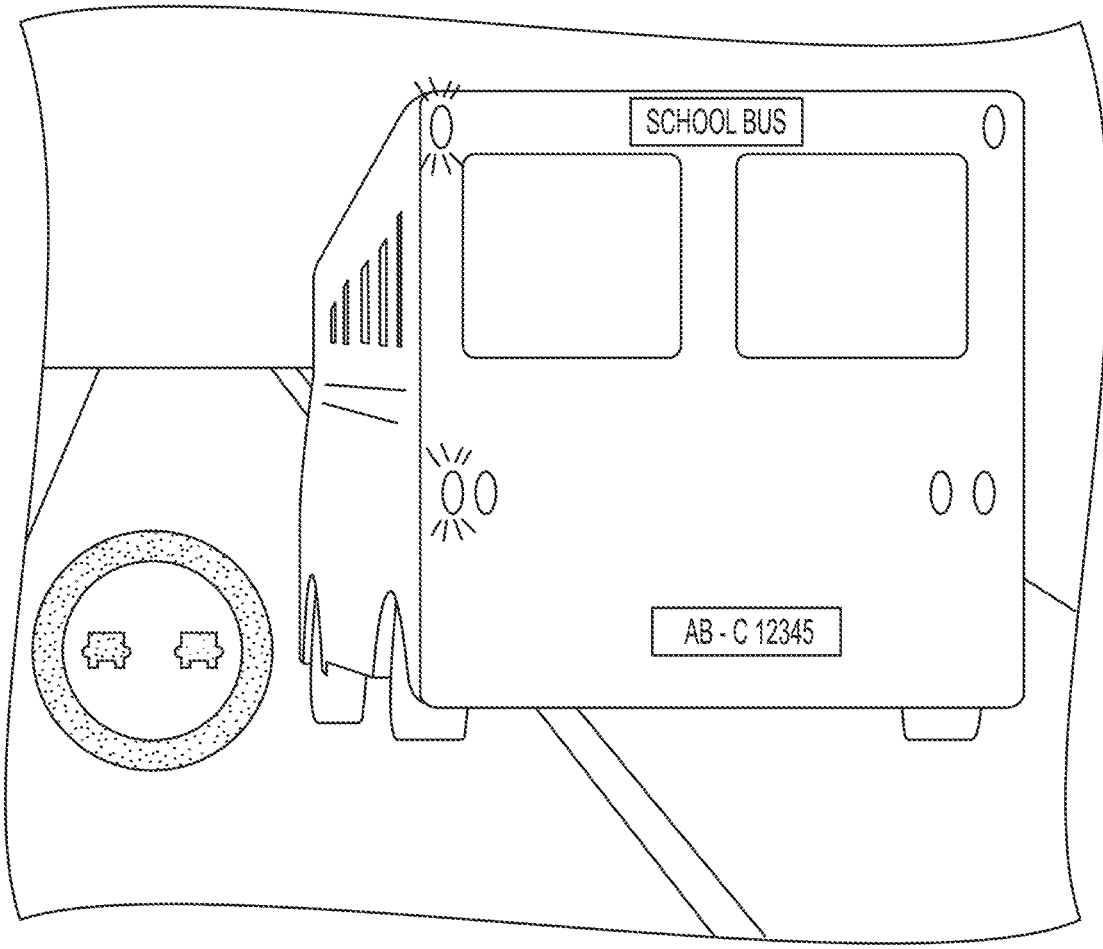

There may be driving contexts which do not need to be brought to the driver's attention, such as, for example, cross traffic information when the vehicle is stopped at a red light. However, a passing ban or no passing symbol may appear or pop up at the display for viewing by the driver of the vehicle when the driver is about to pass a just pulling out school bus (such as shown in FIG. 9). FIG. 9 shows a typical case where local (national) rules are considered by the Mehta data interpretation. For example, in some countries, departing busses have the right of way and can't be overtaken or passed by rule. In the example of FIG. 9, a leaving bus is shown, and the assist system is highlighting a passing ban or no passing symbol, which is not always shown on this location or spot, but is shown there in this example.

Figure 10A:
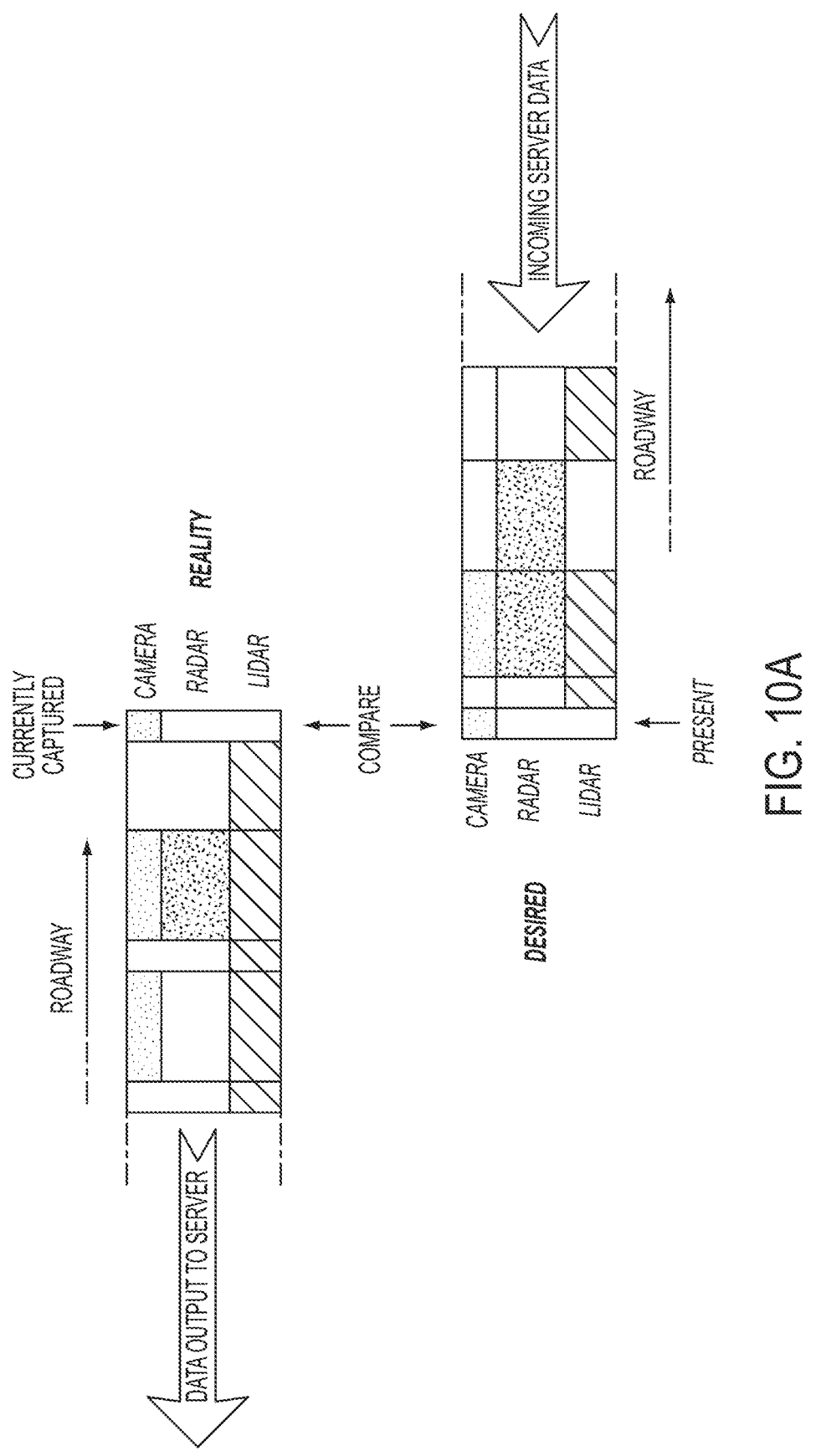
FIG. 10A shows a two way data transmission between a vehicle and a vehicle sensor data server, where the shaded boxes show essential content of a specific sensor group, and wherein, by comparing the currently measured sensor data of several on board system sensors to a stream of data which tell what should be picked up by the sensors at a certain location, the vehicle's algorithm can confirm the planned path is according the (optimal) driving path, with differences or deltas in the data pointing to incidents that may be regarded as unusual and that may trigger corrective manners of the driving assist system of any kind, and wherein the vehicle transmits its own sensor's data, which may already been evaluated.
Figure 10B:
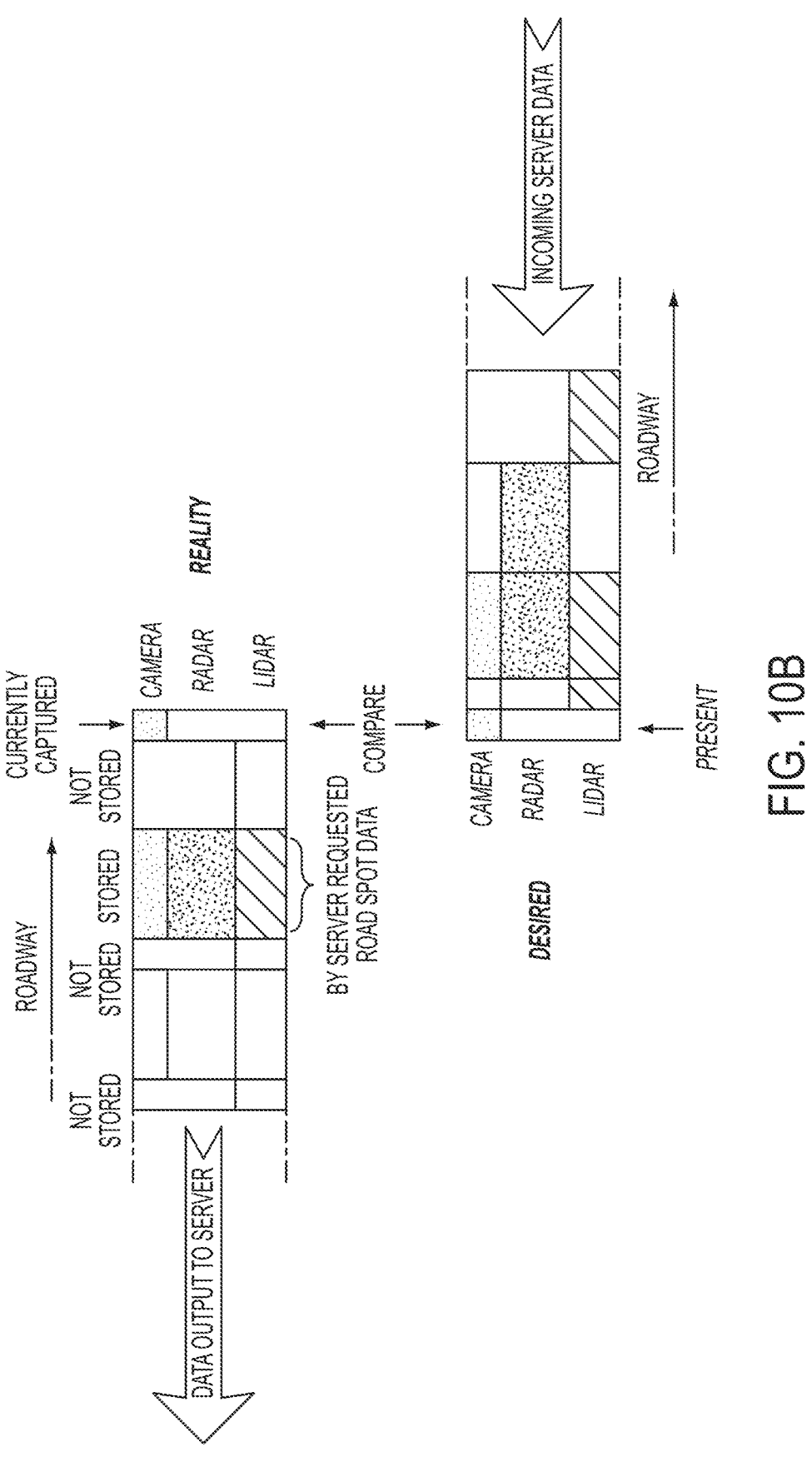
FIG. 10B is similar to FIG. 10A but shows the server controls where vehicle sensor data is transmitted to the server.
Figure 11:
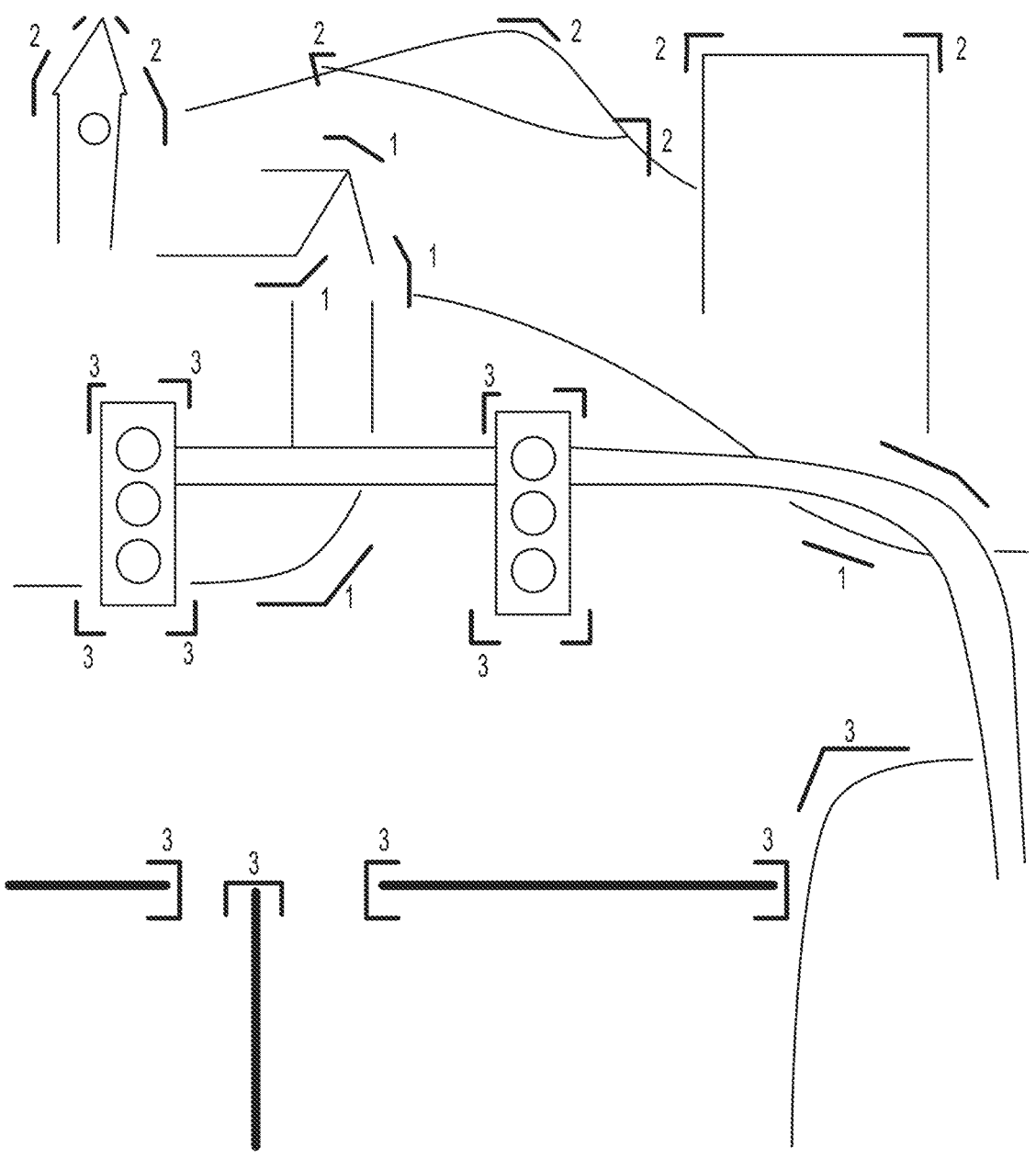
FIG. 11 shows a simplified schematic of a traffic light intersection scene that may be stored and provided to vehicles at that location by a sensor data server similar to that shown in FIGS. 10A and 10B, with the optical data considered important, especially the position of edges of immobile features, especially those which are mostly always visible since these are high enough or seldom hidden by other traffic participants (legend: 2 horizon features, 1 distant features, 3 close features)

Optionally, the system may also possess or include a data transfer channel to a data cloud in the World Wide Web or one or more (special) servers suitable to receive the vehicle's data from several sensors as a stream of data conjuncted to the vehicle's current position while travelling along its path. By that a road may be sampled by a concert of different sensors. The server may collect and merge the incoming data. By the merge of several data sets of different vehicles consecutively passing the same location or area or spot, the characteristic conditions of this location will emerge out of the signal noise. The fixed items will appear in every data set, the mobile or moving items will fade away with the rising number of passed vehicles. The oldest data sets will be overwritten by the newest ones to keep the data high topical. The result will be the average of what one vehicle's sensors should detect at a certain area or geographic location. Due to that, the participating vehicles with data transfer system will receive a data stream from the server matching to the position where they are as to be the desired scene (such as illustrated in FIG. 10A). The filled boxes stand for essential content that a specific sensor should detect when the vehicle is passing the corresponding location. The scene will differ more from the actual captured concert of sensor data the more the vehicle will differ from the recorded average. Driving aid algorithms may always aspire to reduce the differences. Nowadays driving assistant systems may determine which turn lane a vehicle is driving at or in or along. This is necessary, for example, for aiding the correct traffic light information according a specific turning lane (such as shown in the example shown in FIG. 11). Due to the road data being verified by every (equipped) vehicle, these are high topical. By that, the system is a superior classical map based system. Open Street Map® is also high topical but just in terms of the road paths and traffic jam detection.

Due to the proposed system of the present invention, very small local disturbances may be perceived. For example, when there is a location or spot where debris or an object (such as, for example, a piece of cargo that fell off a truck or the like) is located, classical map systems can't give any advice. Highly sophisticated collision avoidance and invasive braking assistant systems may be able to elude a crash, but only if the obstacle is detected by the system of the subject vehicle and is not hidden by the ahead driving traffic. These traffic participants may change their lane for avoiding a collision themselves very late so that the own systems will have to engage a full brake. The system of the present invention would be ready to aid already when just a few other (equipped) traffic participants would have passed the obstacle with their sensors (via detection of the object by the other vehicles' sensors and communication of the detection to the subject vehicle). For example, when vehicles ahead of the subject vehicle detect the debris or object, the communication and/or database is updated and the following subject vehicle's system receives information pertaining to the ahead debris or object, and may generate an alert or control one or more systems (such as a braking or steering or collision avoidance system or the like) responsive at least in part to receipt of a communication of such information. Thus, the hazard warning and avoidance path finding may be started even when the obstacle isn't in the line of sight of the subject vehicle's sensor or sensors.

To reduce the data amounts which are transferred and handled, these may be pre filtered and/or preselected before transferring. This may happen by determining the essential context information by the vehicle algorithm and just transferring these. Hereby the vehicle algorithm may decide to send a data set of a certain location or spot by the measure of the difference which was found there. Alternatively, the server may control the choice of the 'needed' information. The server may request a data set update of a certain location or spot which data tend to outdate but does not request those spots or locations at which data were recently transmitted. An example is shown in FIG. 10A, whereby just a reduced amount of data is stored and transmitted, chosen and requested by the server.

There may be gaps in the data connection. As long the driver enters his desired destination to his navigation system (or driving aid system) the according of the path to be expected data stream may be previously downloaded (such as about 30 seconds early as an example). The vehicle's sensor data may be stored in a record medium until a connection to the server is re-established.

The server may also be able extract statistical evidence out of the sensor data. For example, there may be a location or spot which tends to become slippery when it's wet. This could become an experience value. The driving aid system may become warned regarding that location or spot already at the time rain or snow sets in there.

Figure 4:
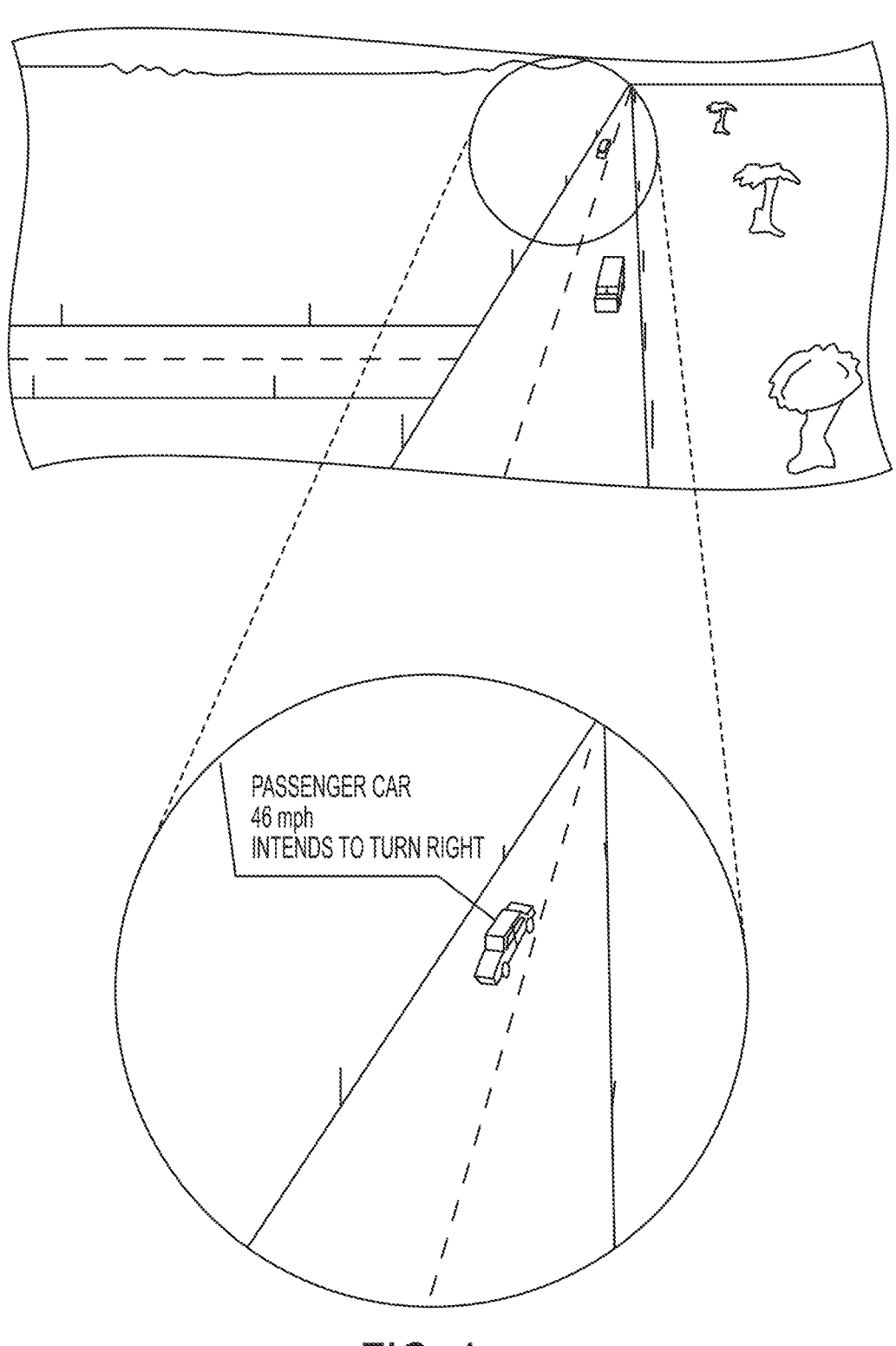
FIG. 4 is a perspective view of a vehicle equipped with the driver assist system of the present invention as the vehicle travels along a road and as the system detects another vehicle on the road ahead of the subject vehicle, with the narrowing vehicle receiving a tag with mehta information which may be composed by on board sensors in combination with received by car to car communication as like shown in FIG. 1.

For example, a vehicle camera picture or captured image data may be processed and analyzed and further processed depending on the context determined or provided by on board sensors and other vehicle or environment information. The system is operable to label the speed and trajectory parameters of an object or traffic participant when the object or other vehicle is very far or distant from the subject vehicle. Additionally, the intended path of the detected vehicle may be provided or received via a signal or output of the navigation system of the tracked vehicle, and the intended path may be labelled and/or reflected to determine the context for switching or adjusting the vision system's view modes. As shown in FIG. 4, the system may operate to focus or enhance the processing of information in the enlarged view section, with reduced processing of other regions where there are no detected objects of interest to the driver of the subject vehicle.

Figure 5:
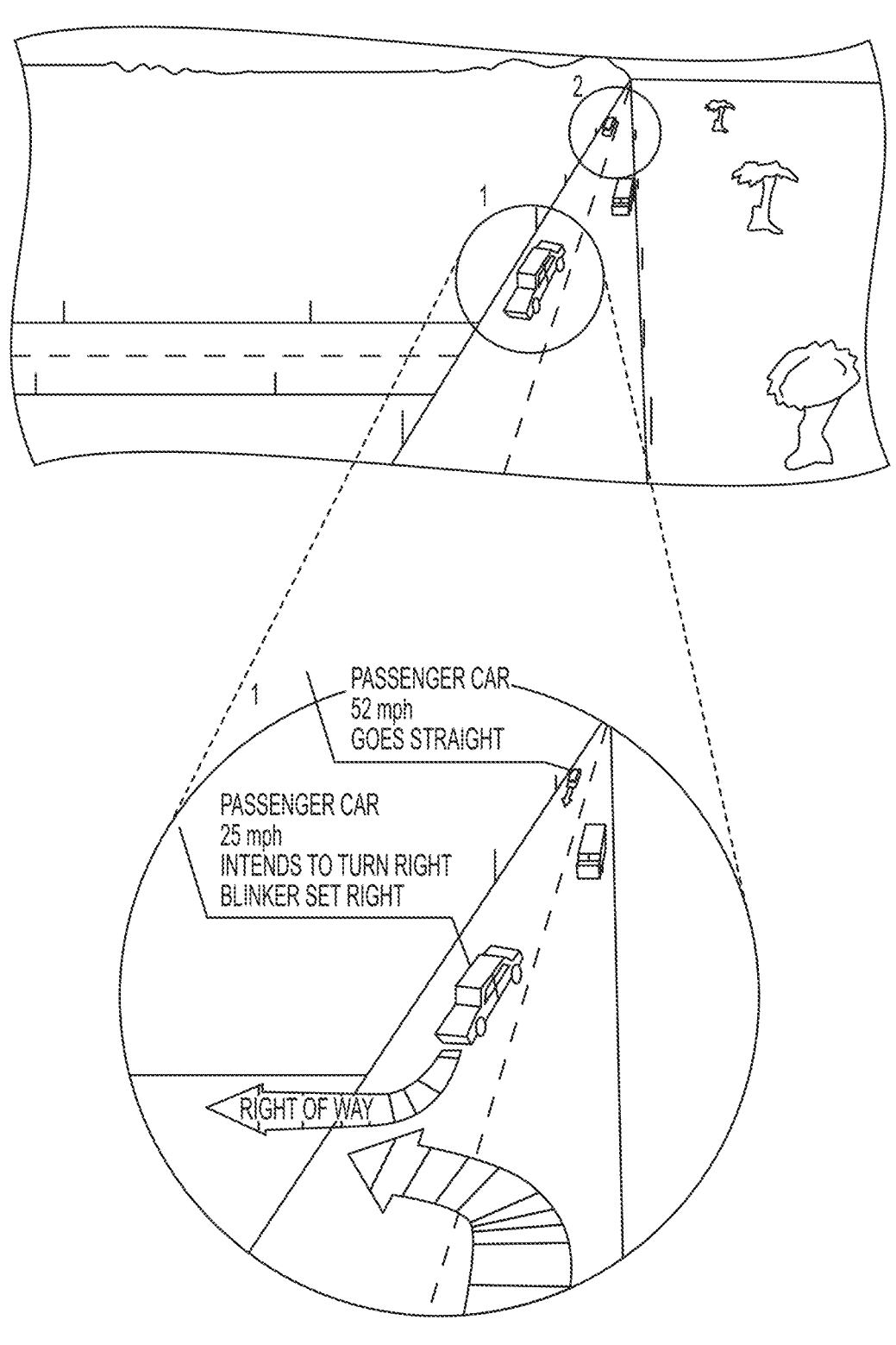
FIG. 5 is another view after the scene shown in FIG. 4, where the system may process images of the first detected vehicle in an intermediate mode and images of the second detected vehicle in a distant mode in accordance with the present invention.

With reference to FIG. 5, another view is shown that may be subsequent to the view shown in FIG. 4. As shown in FIG. 5, the system may, for example, receive updated traffic/road information (such as information that is wirelessly communicated/received from other vehicles and/or from other communication systems associated with the roadway or infrastructure and/or the like) that further indicates the anticipated path of the tracked vehicle. For example, the updated traffic/road information may include information or data indicating that the tracked vehicle (1) has set its turn signal indicator to indicate that the driver of the tracked vehicle intends to turn at an intersection. In the meantime, another traffic participant or vehicle (2) may become relevant and may also be detected and tracked by the system. The processing power of the subject vehicle system may be used to process both of the extracted view sections in FIG. 5. Such enhanced or focused processing may be done in a weighted manner given by the context related priority. Also, the view or section (1) may be processed in the intermediate mode or view filtering, while the view or section (2) may be processed in the distant mode or view filtering.

Also, because the system is operable to switch the view filters or processing modes early (such as responsive to traffic/road information received from sources remote from the subject vehicle, where the information pertains to traffic or roadway problems or characteristics well ahead of the subject vehicle and generally at or out of the effective range of the vehicle-based sensors of the subject vehicle) to detect objects or road parameters or characteristics well ahead of the travelling subject vehicle, the system of the present invention may provide a reduction in false alerts or warnings as compared to systems relying on vehicle-based or on-board sensors and systems alone. The system thus may provide enhanced hazard anticipation, and may limit or substantially preclude misleading interventions and/or warnings.

Therefore, the present invention provides a system that is operable to detect objects or vehicles at or near the subject vehicle and is operable to switch the processing parameters or algorithms in response to such detections or in response to the driving conditions or environment in which the subject vehicle is being driven. The system may receive data or information via wireless communications from other vehicles or from other communication systems remote from the subject vehicle, so that the system may receive data or information pertaining to traffic conditions or road conditions or the like far ahead of the subject vehicle and not yet detected by the vehicle-based sensors of the subject vehicle. The system may switch the processing parameters or algorithms in response to such remote communications to further enhance detection of objects and/or conditions and to further enhance generation of an appropriate alert or warning or display or the like responsive to the detected object/condition.

The vehicle may include any type of sensor or sensors, such as imaging sensors or radar sensors or lidar sensors or ultrasonic sensors, time of flight sensors, structured light sensors or the like (such as by utilizing aspects of the systems described in U.S. Pat. No. 8,013,780, which is hereby incorporated herein by reference in its entirety). For example, the object detection sensor may comprise an imaging sensor or camera that may capture image data for image processing, and may comprise any suitable camera or sensing device, such as, for example, an array of a plurality of photosensor elements arranged in 640 columns and 480 rows (a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, such as in the manner described in U.S. Pat. Nos. 5,550,677; 5,877,897; 6,498,620; 5,670,935; 5,796,094 and/or 6,396,397, which are all hereby incorporated herein by reference in their entireties. The system may communicate with other communication systems via any suitable means, such as by utilizing aspects of the systems described in PCT Application No. PCT/US10/038477, filed Jun. 14, 2010 and published Dec. 16, 2010 as International Publication No. WO 2010/144900, and/or U.S. patent application Ser. No. 13/202,005, filed Aug. 17, 2011 and published Mar. 15, 2012 as U.S. Publication No. US-2012-0062743, which are hereby incorporated herein by reference in their entireties.

The image processing and algorithmic processing may comprise any suitable means for processing the images and/or image data. For example, the vision system and/or processing may utilize aspects described in U.S. Pat. Nos. 7,005,974; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or PCT Application No. PCT/US2010/047256, filed Aug. 31, 2010 and published Mar. 10, 2011 as International Publication No. WO 2011/028686, and/or International Publication No. WO 2010/099416, published Sep. 2, 2010, and/or U.S. provisional applications, Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/567,150, filed Dec. 6, 2011; Ser. No. 61/565,713, filed Dec. 1, 2011; Ser. No. 61/563,965, filed Nov. 28, 2011; Ser. No. 61/559,970, filed Nov. 15, 2011; Ser. No. 61/556,556, filed Nov. 7, 2011; Ser. No. 61/554,663, filed Nov. 2, 2011; Ser. No. 61/550,664, filed Oct. 24, 2011; Ser. No. 61/552,167, filed Oct. 27, 2011; and/or Ser. No. 61/548,902, filed Oct. 19, 2011, and/or PCT Application No. PCT/CA2012/000378, filed Apr. 25, 2012 and published Nov. 1, 2012 as International Publication No. WO 2012/145822, and/or PCT Application No. PCT/US2012/056014, filed Sep. 19, 2012 and published Mar. 28, 2013 as International Publication No. WO 2013/043661, and/or PCT Application No. PCT/US12/57007, filed Sep. 25, 2012 and published Apr. 4, 2013 as International Publication No. WO 2013/048994, and/or PCT Application No. PCT/US2012/048800, filed Jul. 30, 2012 and published Feb. 7, 2013 as International Publication No. WO 2013/019707, and/or PCT Application No. PCT/US2012/048110, filed Jul. 25, 2012 and published Jan. 31, 2013 as International Publication No. WO 2013/016409, and/or U.S. patent application Ser. No. 13/534,657, filed Jun. 27, 2012 and published Jan. 3, 2013 as U.S. Publication No. US-2013-0002873, which are all hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No.

12/508,840, filed Jul. 24, 2009, and published Jan. 28, 2010 as U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the driver assist system and/or vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011 and published Jun. 28, 2012 as U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,855, 755; 7,626,749; 7,581,859; 7,446,924; 7,446,650; 7,370, 983; 7,338,177; 7,329,013; 7,308,341; 7,289,037; 7,274, 501; 7,255,451; 7,249,860; 7,195,381; 7,184,190; 7,004, 593; 6,877,888; 6,824,281; 6,690,268; 6,672,744; 6,642, 851; 6,513,252; 6,386,742; 6,329,925; 6,222,460; 6,173, 508; 6,124,886; 6,087,953; 5,878,370; 5,802,727; 5,737, 226; 5,724,187; 5,708,410; 5,699,044; 5,677,851; 5,668, 663; 5,632,092; 5,576,687; 5,530,240; 4,953,305 and/or 4,546,551, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the driver assist system and/or vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/048993, filed Jul. 31, 2012 and published Feb. 7, 2013 as International Publication No. WO 2013/019795, and/or PCT Application No. PCT/CA2012/000378, filed Apr. 25, 2012 and published Nov. 1, 2012 as International Publication No. WO 2012/145822, and/or U.S. patent application Ser. No. 13/333,337, filed Dec. 21, 2011 and published Jun. 28, 2012 as U.S. Publication No. US-2012-0162427, and/or U.S. provisional applications, Ser. No. 61/615,410, filed Mar. 26, 2012; Ser. No. 61/588,833, filed Jan. 20, 2012; Ser. No. 61/570,017, filed Dec. 13, 2011; Ser. No. 61/568,791, filed Dec. 9, 2011; and/or Ser. No. 61/559,970, filed Nov. 15, 2011, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular multi-sensor sensing system, the vehicular multi-sensor sensing system comprising:
   a plurality of sensors disposed at a vehicle equipped with the vehicular multi-sensor sensing system;
   wherein the plurality of sensors comprises a camera viewing forward of the equipped vehicle;
   wherein the camera is operable to capture image data;
   wherein the plurality of sensors comprises a radar sensor sensing forward of the equipped vehicle;
   wherein the radar sensor is operable to capture radar data;
   wherein a processor is operable (i) to process image data captured by the camera and (ii) to process radar data captured by the radar sensor;
   wherein data is wirelessly transmitted from the equipped vehicle to a remote server;
   wherein the data wirelessly transmitted from the equipped vehicle to the remote server is based at least in part on processing at the processor of at least one selected from the group consisting of (i) image data captured by the camera and (ii) radar data captured by the radar sensor;
   wherein the data wirelessly transmitted from the equipped vehicle to the remote server is conjuncted to a current geographic location of the equipped vehicle along a road being travelled by the equipped vehicle; and
   wherein the remote server merges data wirelessly transmitted from the equipped vehicle with data wirelessly transmitted from a plurality of other vehicles traveling along the road along which the equipped vehicle is traveling, and wherein the remote server processes the merged data to determine at least one characteristic along the road being travelled by the equipped vehicle.

2. The vehicular multi-sensor sensing system of claim 1, wherein the remote server, based at least in part on the merged data, wirelessly transmits a data stream to the equipped vehicle.

3. The vehicular multi-sensor sensing system of claim 2, wherein, based at least in part on the data stream that is wirelessly transmitted to the equipped vehicle from the remote server, the vehicular multi-sensor sensing system determines the at least one characteristic along the road before the at least one characteristic is detected via processing at the processor of at least one selected from the group consisting of (i) image data captured by the camera and (ii) radar data captured by the radar sensor.

4. The vehicular multi-sensor sensing system of claim 3, wherein, based at least in part on the data stream that is wirelessly transmitted to the equipped vehicle from the remote server, the vehicular multi-sensor sensing system controls at least one vehicle function of the equipped vehicle.

5. The vehicular multi-sensor sensing system of claim 4, wherein the determined at least one characteristic along the road comprises a potential hazard.

6. The vehicular multi-sensor sensing system of claim 5, wherein the vehicular multi-sensor sensing system, responsive at least in part to processing at the processor of (i) image data captured by the camera and (ii) radar data captured by the radar sensor, determines that the potential hazard is within a threshold distance of the equipped vehicle.

7. The vehicular multi-sensor sensing system of claim 6, wherein the threshold distance is based at least in part on an environment in which the equipped vehicle is operating.

8. The vehicular multi-sensor sensing system of claim 7, wherein the potential hazard comprises another vehicle.

9. The vehicular multi-sensor sensing system of claim 4, wherein the at least one vehicle function of the equipped vehicle comprises braking of the equipped vehicle.

10. The vehicular multi-sensor sensing system of claim 4, wherein the at least one vehicle function of the equipped vehicle comprises steering of the equipped vehicle.

11. The vehicular multi-sensor sensing system of claim 4, wherein the at least one vehicle function of the equipped vehicle comprises braking of the equipped vehicle and steering of the equipped vehicle.

12. The vehicular multi-sensor sensing system of claim 4, wherein a lidar sensor is disposed at the equipped vehicle, and wherein the lidar sensor senses forward of the equipped vehicle and is operable to capture lidar data, and wherein captured lidar data is processed by the vehicular multi-sensor sensing system to assist in determining the at least one characteristic along the road.

13. The vehicular multi-sensor sensing system of claim 4, wherein the vehicular multi-sensor sensing system alerts a driver of the equipped vehicle of the determined at least one characteristic along the road.

14. The vehicular multi-sensor sensing system of claim 4, wherein the determined at least one characteristic along the road comprises an intersection to the road ahead of the equipped vehicle.

15. The vehicular multi-sensor sensing system of claim 2, wherein the data stream wirelessly transmitted to the equipped vehicle from the remote server comprises information pertaining to a road condition of the road being traveled along by the equipped vehicle.

16. The vehicular multi-sensor sensing system of claim 15, wherein the road condition comprises a potential hazard.

17. The vehicular multi-sensor sensing system of claim 16, wherein the potential hazard comprises debris on the road being traveled along by the equipped vehicle.

18. The vehicular multi-sensor sensing system of claim 2, wherein the data stream wirelessly transmitted to the equipped vehicle from the remote server includes information associated with a driving condition of another vehicle traveling along the road.

19. The vehicular multi-sensor sensing system of claim 2, wherein the data stream wirelessly transmitted to the equipped vehicle from the remote server is received via a time coded time of flight communication.

20. The vehicular multi-sensor sensing system of claim 1, wherein the equipped vehicle is in car-to-car communication with another vehicle ahead of the equipped vehicle.

21. The vehicular multi-sensor sensing system of claim 20, wherein the car-to-car communication is indicative of the other vehicle approaching an intersection to the road.

22. The vehicular multi-sensor sensing system of claim 21, wherein the car-to-car communication includes information that a turn signal of the other vehicle is activated to indicate that the other vehicle will turn at the intersection.

23. The vehicular multi-sensor sensing system of claim 1, wherein captured radar data is processed by the vehicular multi-sensor sensing system to assist in determining presence of a potential hazard.

24. A vehicular multi-sensor sensing system, the vehicular multi-sensor sensing system comprising:

a plurality of sensors disposed at a vehicle equipped with the vehicular multi-sensor sensing system;

wherein the plurality of sensors comprises a camera viewing forward of the equipped vehicle;

wherein the camera is operable to capture image data;

wherein the plurality of sensors comprises a radar sensor sensing forward of the equipped vehicle;

wherein the radar sensor is operable to capture radar data;

wherein a processor is operable (i) to process image data captured by the camera and (ii) to process radar data captured by the radar sensor;

wherein data is wirelessly transmitted from the equipped vehicle to a remote server;

wherein the data wirelessly transmitted from the equipped vehicle to the remote server is based at least in part on processing at the processor of at least one selected from the group consisting of (i) image data captured by the camera and (ii) radar data captured by the radar sensor;

wherein the data wirelessly transmitted from the equipped vehicle to the remote server is conjuncted to a current geographic location of the equipped vehicle along a road being travelled by the equipped vehicle;

wherein the remote server merges data wirelessly transmitted from the equipped vehicle with data wirelessly transmitted from a plurality of other vehicles traveling along the road along which the equipped vehicle is traveling, and wherein the remote server processes the merged data to determine at least one characteristic along the road being travelled by the equipped vehicle;

wherein the determined at least one characteristic along the road comprises an intersection to the road ahead of the equipped vehicle; and wherein captured radar data is processed by the vehicular multi-sensor sensing system to assist in determining presence of a potential hazard.

25. The vehicular multi-sensor sensing system of claim 24, wherein the remote server, based at least in part on the merged data, wirelessly transmits a data stream to the equipped vehicle.

26. The vehicular multi-sensor sensing system of claim 25, wherein, based at least in part on the data stream that is wirelessly transmitted to the equipped vehicle from the remote server, the vehicular multi-sensor sensing system determines the at least one characteristic along the road before the at least one characteristic is detected via processing at the processor of at least one selected from the group consisting of (i) image data captured by the camera and (ii) radar data captured by the radar sensor.

27. The vehicular multi-sensor sensing system of claim 26, wherein, based at least in part on the data stream that is wirelessly transmitted to the equipped vehicle from the remote server, the vehicular multi-sensor sensing system controls at least one vehicle function of the equipped vehicle.

28. The vehicular multi-sensor sensing system of claim 27, wherein the determined at least one characteristic along the road comprises a potential hazard.

29. The vehicular multi-sensor sensing system of claim 28, wherein the vehicular multi-sensor sensing system, responsive at least in part to processing at the processor of (i) image data captured by the camera and (ii) radar data captured by the radar sensor, determines that the potential hazard is within a threshold distance of the equipped vehicle.

30. The vehicular multi-sensor sensing system of claim 29, wherein the threshold distance is based at least in part on an environment in which the equipped vehicle is operating.

31. The vehicular multi-sensor sensing system of claim 30, wherein the potential hazard comprises another vehicle.

32. The vehicular multi-sensor sensing system of claim 27, wherein the at least one vehicle function of the equipped vehicle comprises at least one selected from the group consisting of (i) braking of the equipped vehicle and (ii) steering of the equipped vehicle.

33. The vehicular multi-sensor sensing system of claim 25, wherein the vehicular multi-sensor sensing system alerts a driver of the equipped vehicle of the determined at least one characteristic along the road.

34. The vehicular multi-sensor sensing system of claim 25, wherein the data stream wirelessly transmitted to the equipped vehicle from the remote server comprises information pertaining to a road condition of the road being traveled along by the equipped vehicle.

35. The vehicular multi-sensor sensing system of claim 34, wherein the road condition comprises a potential hazard.

36. The vehicular multi-sensor sensing system of claim 35, wherein the potential hazard comprises debris on the road being traveled along by the equipped vehicle.

37. The vehicular multi-sensor sensing system of claim 25, wherein the data stream wirelessly transmitted to the equipped vehicle from the remote server includes information associated with a driving condition of another vehicle traveling along the road.

38. A vehicular multi-sensor sensing system, the vehicular multi-sensor sensing system comprising:

a plurality of sensors disposed at a vehicle equipped with the vehicular multi-sensor sensing system;

wherein the plurality of sensors comprises a camera viewing forward of the equipped vehicle;

wherein the camera is operable to capture image data;

wherein the plurality of sensors comprises a radar sensor sensing forward of the equipped vehicle;

wherein the radar sensor is operable to capture radar data;

wherein a processor is operable (i) to process image data captured by the camera and (ii) to process radar data captured by the radar sensor;

wherein data is wirelessly transmitted from the equipped vehicle to a remote server;

wherein the data wirelessly transmitted from the equipped vehicle to the remote server is based at least in part on processing at the processor of at least one selected from the group consisting of (i) image data captured by the camera and (ii) radar data captured by the radar sensor;

wherein the data wirelessly transmitted from the equipped vehicle to the remote server is conjuncted to a current geographic location of the equipped vehicle along a road being travelled by the equipped vehicle;

wherein the remote server merges data wirelessly transmitted from the equipped vehicle with data wirelessly transmitted from a plurality of other vehicles traveling along the road along which the equipped vehicle is traveling, and wherein the remote server processes the merged data to determine at least one characteristic along the road being travelled by the equipped vehicle;

wherein the remote server, based at least in part on the merged data, wirelessly transmits a data stream to the equipped vehicle; and wherein, based at least in part on the data stream that is wirelessly transmitted to the equipped vehicle from the remote server, the vehicular multi-sensor sensing system at least one selected from the group consisting of (i) controls braking of the equipped vehicle, (ii) controls steering of the equipped vehicle and (iii) alerts a driver of the equipped vehicle of the determined at least one characteristic along the road.

39. The vehicular multi-sensor sensing system of claim 38, wherein, based at least in part on the data stream that is wirelessly transmitted to the equipped vehicle from the remote server, the vehicular multi-sensor sensing system determines the at least one characteristic along the road before the at least one characteristic is detected via processing at the processor of at least one selected from the group consisting of (i) image data captured by the camera and (ii) radar data captured by the radar sensor.

40. The vehicular multi-sensor sensing system of claim 39, wherein the determined at least one characteristic along the road comprises a potential hazard.

41. The vehicular multi-sensor sensing system of claim 40, wherein the vehicular multi-sensor sensing system, responsive at least in part to processing at the processor of (i) image data captured by the camera and (ii) radar data captured by the radar sensor, determines that the potential hazard is within a threshold distance of the equipped vehicle.

42. The vehicular multi-sensor sensing system of claim 40, wherein the potential hazard comprises another vehicle.

43. The vehicular multi-sensor sensing system of claim 38, wherein the determined at least one characteristic along the road comprises an intersection to the road ahead of the equipped vehicle.

44. The vehicular multi-sensor sensing system of claim 38, wherein the data stream wirelessly transmitted to the equipped vehicle from the remote server comprises information pertaining to a road condition of the road being traveled along by the equipped vehicle.

45. The vehicular multi-sensor sensing system of claim 44, wherein the road condition comprises a potential hazard.

46. The vehicular multi-sensor sensing system of claim 45, wherein the potential hazard comprises debris on the road being traveled along by the equipped vehicle.

47. The vehicular multi-sensor sensing system of claim 38, wherein the data stream wirelessly transmitted to the equipped vehicle from the remote server includes information associated with a driving condition of another vehicle traveling along the road.

48. The vehicular multi-sensor sensing system of claim 38, wherein the data stream wirelessly transmitted to the equipped vehicle from the remote server is received via a time coded time of flight communication.

* * * * *